(12) United States Patent
Aydin et al.

(10) Patent No.: US 11,685,820 B2
(45) Date of Patent: *Jun. 27, 2023

(54) BIO-BASED POLYELECTROLYTE COMPLEX COMPOSITIONS WITH INCREASED HYDROPHOBICITY COMPRISING FATTY COMPOUNDS

(71) Applicant: ORGANOCLICKAB, Taby (SE)

(72) Inventors: Juhanes Aydin, Södertälje (SE); Maria Wennman, Solna (SE)

(73) Assignee: ORGANOCLICK AB, Taby (SE)

( * ) Notice: Subject to any disclaimer, the term of this patent is extended or adjusted under 35 U.S.C. 154(b) by 325 days.

This patent is subject to a terminal disclaimer.

(21) Appl. No.: 16/282,551

(22) Filed: Feb. 22, 2019

(65) Prior Publication Data

US 2019/0284368 A1    Sep. 19, 2019

Related U.S. Application Data

(63) Continuation of application No. PCT/SE2017/050851, filed on Aug. 24, 2017.

(30) Foreign Application Priority Data

Aug. 24, 2016 (SE) .................... 1651136-2
Aug. 24, 2016 (SE) .................... 1651137-0

(51) Int. Cl.
   *C08L 5/08*    (2006.01)
   *C08L 1/28*    (2006.01)
   (Continued)

(52) U.S. Cl.
   CPC ............... *C08L 5/08* (2013.01); *B05D 1/00* (2013.01); *B05D 5/08* (2013.01); *C08L 1/286* (2013.01);
   (Continued)

(58) Field of Classification Search
   CPC ............... B05D 1/00; B05D 5/08; D06B 1/00
   See application file for complete search history.

(56) References Cited

U.S. PATENT DOCUMENTS 6,060,410 A  *  5/2000  Gillberg-LaForce ........................ D06M 15/3566
                                                                      442/118
6,555,225 B1    4/2003  Yoshioka et al.
(Continued)

FOREIGN PATENT DOCUMENTS

CN    102120514 A    7/2011
CN    105061821 A    11/2015
(Continued)

OTHER PUBLICATIONS

Sigma Aldrich produktinfo chitosan.
(Continued)

*Primary Examiner* — Kelly M Gambetta
(74) *Attorney, Agent, or Firm* — Renner, Otto, Boisselle & Sklar, LLP

(57) ABSTRACT

The invention relates to a bio-based polyelectrolyte complex (PEC) composition suitable as a binder for fiber based materials, textiles, woven and nonwoven materials, said PEC composition comprising cationic biopolymer, anionic biopolymer, acid and a preservative, and wherein the net charge of the PEC is cationic, the charge ratio of the anionic polymer and the cationic polymer is ≤1, the cationic biopolymer is chitosan, the anionic biopolymer is a polyanion derived from nature, the acid is a Brønsted acid and/or a Lewis acid, wherein the Brønsted acid is selected from any organic and/or inorganic acids, and wherein the Lewis acid is selected from any cationic mono- or multivalent atom, the weight ratio between cation and anion is 1:0.1 to 1:20, the weight ratio between the cation and acid is 1:0.01 to 1:30, chitosan has a degree of deacetylation being 66-100%, the
(Continued)

pH is less than 7, and wherein said composition further comprises one or more fatty compounds as well as methods and use thereof. The present invention further relates to a method for preparing the PEC composition, uses of the PEC composition, as well as method of treating materials with the PEC composition.

5 Claims, 7 Drawing Sheets

(51) Int. Cl.
D06N 3/00 (2006.01)
D06B 1/00 (2006.01)
B05D 1/00 (2006.01)
B05D 5/08 (2006.01)

(52) U.S. Cl.
CPC ............ *D06B 1/00* (2013.01); *D06N 3/0059* (2013.01); C08L 2205/02 (2013.01); D06N 2209/142 (2013.01); D10B 2401/021 (2013.01)

(56) References Cited

U.S. PATENT DOCUMENTS

| | | | |
|---|---|---|---|
| 2006/0205932 A1 | 9/2006 | Cowan et al. | |
| 2007/0141013 A1 | 6/2007 | Nguyen-Kim | |
| 2008/0000585 A1 | 1/2008 | Kim et al. | |
| 2008/0005852 A1* | 1/2008 | Hu | D06M 15/263 8/115.51 |
| 2011/0236450 A1 | 9/2011 | Scheuing et al. | |
| 2011/0236582 A1* | 9/2011 | Scheuing | A01N 33/12 427/331 |
| 2013/0016431 A1 | 1/2013 | Taudien et al. | |
| 2013/0143041 A1 | 6/2013 | Mathias | |
| 2013/0164311 A1* | 6/2013 | DeCarlo | C08J 3/075 424/184.1 |
| 2013/0216592 A1 | 8/2013 | Delair et al. | |
| 2015/0105478 A1 | 4/2015 | Van Der Krieken et al. | |

FOREIGN PATENT DOCUMENTS

| | | |
|---|---|---|
| CN | 105148741 A | 12/2015 |
| DE | 101 20 748 A1 | 10/2002 |
| DE | 102010001891 A1 | 8/2011 |
| EP | 0504245 A1 | 9/1992 |
| EP | 1096056 A1 | 5/2001 |
| EP | 1247568 A1 | 10/2002 |
| EP | 1254983 A1 | 11/2002 |
| EP | 1918456 A1 | 5/2008 |
| EP | 1579071 B1 | 7/2008 |
| EP | 1942226 A1 | 7/2008 |
| FR | 2963351 A1 | 2/2012 |
| JP | H05117111 | 5/1993 |
| JP | H06277038 A | 10/1994 |
| JP | 3289055 B2 | 6/2002 |
| JP | 2005247967 A | 9/2005 |
| RU | 2594422 C1 | 8/2016 |
| WO | 93/12282 A1 | 6/1993 |
| WO | 9728311 A1 | 8/1997 |
| WO | 0121671 A1 | 3/2001 |
| WO | 2006029407 A2 | 3/2006 |
| WO | 2007083262 A1 | 7/2007 |
| WO | 2009/142719 A2 | 11/2009 |
| WO | 2009142719 A2 | 11/2009 |
| WO | 2013133705 A1 | 9/2013 |
| WO | 2013133706 A1 | 9/2013 |
| WO | 2015034357 A1 | 3/2015 |

OTHER PUBLICATIONS

Gärdlund, L. et al. "Polyelectrolyte complexes for surface modification of wood fibres II. Influence of complexes on wet and dry strength of paper" In: Colloids and Surfaces A:Physicochem. Eng. Aspects, 2003, vol. 218, pp. 137-149.

Zhao Q et al : "Synthesis and characterization of soluble chitosan/ sodium carboxymethyl cellulose polyelectrolyte complexes and the pervaporation dehydration of their homogeneous membranes", Journal of Membrane Science, Elsevier BV, NL, vol. 333, No. 1-2, May 1, 2009 (May 1, 2009), pp. 68-78, XP026031531, ISSN : 0376-7388, DOI : 10.1016/ J.MEMSCI. 2009 .02 .001 [retrieved on Feb. 10, 2009].

Jiang Liuyun et al: "A novel composite membrane of chitosan-carboxymethyl cellulose polyelectrolyte complex membrane filled with nano-hydroxyapatite I. Preparation and properties", Journal of Materials Science: Materials in Medicine , Kluwer Academic Publishers, BO, vol. 20 , No. 8, Mar. 20, 2009 (Mar. 20, 2009), pp. 1645-1652, XP019730934, ISSN: 1573-4838, DOI: 10.1007/S10856-009-3720-6 paragraph [2 .2.] p. 71 , col. 1, paragraph 1; figure 1.

Dian-Yu Ji et al: "A novel injectable chitosan/ polyglutamate polyelectrolyte complex hydrogel with hydroxyapatite for soft-tissue augmentation", Carbohydrate Polymers, Appli ed Sci ence Publishers, Ltd. Barking, GB, vol. 89, No. 4, Mar. 26, 2012 (Mar. 26, 2012), pp. 1123-1130, XP028512034, ISSN: 0144-8617, DOI.

Albertini Beatrice et al: "Novel multifunctional platforms for potential treatment of cutaneous wounds: Development and in vitro characterization", International Journal of Pharmaceutics, Elsevier, Amsterdam, NL, vol. 440, No. 2, Jun. 9, 2012 (Jun. 9, 2012), pp. 238-249, XP028962905 , ISSN: 0378-5173, 001.

Nirmala Devi et al: "Genipin Crosslinked Chitosan-[kappaJ-carrageenan Polyelectrolyte Nanocapsules for the Controlled Delivery of Isoniazid", International Journal of Polymeric Materials., vol. 59, No. 10, Aug. 2, 2010 (Aug. 2, 2010), pp. 828-841 , XP55420537, US.

Nirmala Devi et al: "A novel microencapsulation of neem ( Azadirachta Indica A. Juss.) seed oil (NSO) in polyelectrolyte complex of [kappaJ-carrageenan and chitosan", Journal of Applied Polymer Science, vol. 113 , No. 3, Aug. 5, 2009 (Aug. 5, 2009), pp. 1576-1583, XP55420484, US ISSN: 0021-8995, 001: 10.1002/app. 30038.

Fatehi, P. et al. "Complex formation of modified chitosan and carboxymethyl cellulose and its effect on paper properties" In: Tappi Journal, 2009, vol. 8, pp. 29-35; pp. 29-30.

Fatehi, P. et al. "Synergy of CMC and modified chitosan on strength properties of cellulosic fiber network" In: Carbohydrate Polymers, 2010, vol. 80, pp. 208-214; pp. 208-209.

Szymanaska et al. "Stability of Chitosan—A challenge for pharmaceutical and biomedical applications" In: Marine Drugs, 2015, vol. 13, pp. 1819-1846.

Drogoz, A. et al. "Towards Biocompatible Vaccine delivery Systems: Interactions of Colloidal PECs Based on Polysaccharides with HIV-1 p24 Antigen" In: Biomacromolecules, 2008, vol. 9, pp. 583-591; pp. 583-584.

\* cited by examiner

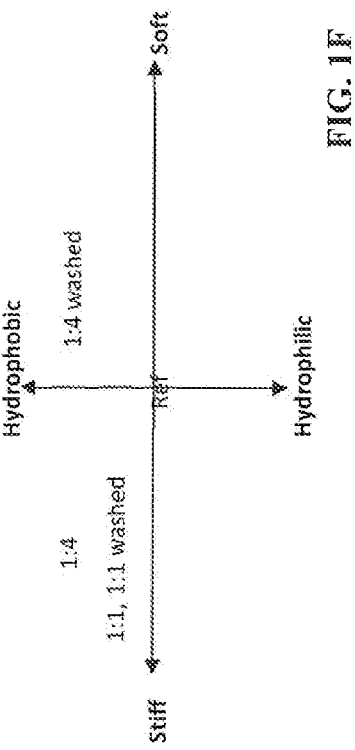
FIG. 1C
FIG. 1D
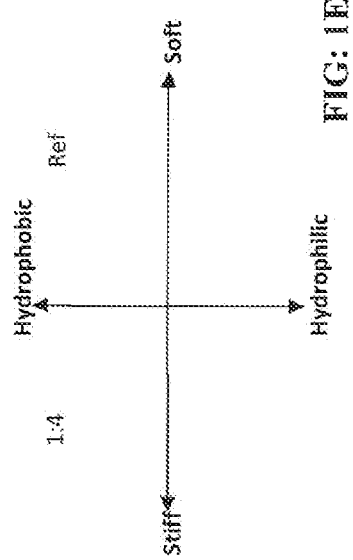
FIG. 1E
FIG. 1F

Hydrophobicity vs stiffness after wash

Figure 3 – Detailed description of scanned fatty compounds.

| Fatty compound | Producer | Description | Emulsion | | | Hydrophobicity | | |
|---|---|---|---|---|---|---|---|---|
| | | | Day 0 | Day 1 | Day 0 | Day 1 | Day 7 |
| Sunflower oil | ICA | Triglyceride, mix of fatty acid | ok | ok | - | ++ to +++ | +++ |
| Sunflower oil | AAK | Triglyceride, mix of fatty acid | ok | ok | - | ++ to +++ | +++ |
| Sunflower oil | Cargill Industrial Specialties | Triglyceride, mix of fatty acid | ok | ok | - | + | +++ |
| High oleic sunflower oil | Cargill Industrial Specialties | Triglyceride, mix of fatty acid | ok | ok | - | + | +++ |
| Sylfat 2 | IMCD | Tall oil fatty acid | ok | ok | - | + to +++ | + to +++ |
| Rapeseed oil | ICA | Triglyceride, mix of fatty acid | ok | ok | - | + to +++ | +++ |
| Castor oil | Cargill Industrial Specialties | Triglyceride, mix of fatty acid | ok | ok | - | + to +++ | + to +++ |
| Corn oil | Cargill Industrial Specialties | Triglyceride, mix of fatty acid | ok | ok | + to ++ | +++ | +++ |
| Epoxidized soy bean oil (ESBO), Soyflex 6330 | Soyventis / Vendico | Soy bean oil with epoxy groups instead of double bonds | ok | ok | + | + to ++ | + to ++ |
| Soy bean stand oil, SHE 77 7P | Oleon / Vendico | Polymerized soy bean oil | ok | some white on edges | + | ++ to +++ | +++ |
| Soy bean stand oil, SHE 77 30P | Oleon / Vendico | Polymerized soy bean oil | ok | ok | + | ++ | +++ |
| Octanoeic acid | Acros Organic | Fatty acid, C8 | separation | | - | - | - |
| Oleic acid | Alfa aeser | Fatty acid | ok | ok | - | - | - |
| Oleine palm. Radiacid 0253 | Oleon / Vendico | Mix of fatty acids | ok | ok | - | - | - |
| Oleine soya, Radiacid 0202 | Oleon / Vendico | Mix of fatty acids. Tall oil fatty acid counter type | ok | ok | - | - | - |

| Name | Supplier | Description | | | | | |
|---|---|---|---|---|---|---|---|
| Soy bean oil fatty acid destilled, Nouracide SF 45 | Oleon / Vendico | Mix of fatty acids, destilled | ok | ok | | - | - |
| Sunflower oil fatty acid destilled, Nouracide HE 45 | Oleon / Vendico | Mix of fatty acids, destilled | ok | ok | | - | - |
| Conjugated sunflower oil fatty acids, Nouracide HE456 | Oleon / Vendico | Mix of fatty acids, conjugated | ok | ok | | - | - |
| Conjugated sunflower oil fatty acids, Nouracide HE301 | Oleon / Vendico | Mix of fatty acids, conjugated | ok | ok | | - | - |
| Sorbitan Oleate, Span 80 | Croda | Sorbitan + C18 Mono unsaturated | ok | ok | + | - | +++ |
| Potassium palmate, Eursaol PZT | IMCD, EOC, 66072-07-9, 266-119-7 | Mix of fatty acid salts of palm oil | ok | ok | + | - | + |
| Potassium tallate, Eursaol KT | IMCD, EOC, 61790-44-1, 263-136-1 | Mix of fatty acid salts of tall oil | ok | ok | + | - | - |
| Potassium cocoate, Eursaol KPZ | IMCD, EOC, 61789-049-9, 263-049-9 | Mix of fatty acid salts of coconut oil | ok | ok | + | + | + |
| Soy lecithin, Leciprime 1000 IP | Cargill | Phospholipids, composed of phosphoric acid with choline, glycerol or other fatty acids usually glycolipids or triglyceride | ok | ok | ++ to +++ | +++ | |
| Polysorb ID46 | Roquette | Isosorbide ester | ok | ok | - | - | - |
| Methyl ester of rosin, Abalyn | Pinova | Modified resin from pine/conifer | ok | ok | - | - | - |
| Hydrogenated methyl ester of rosin, Hercolyn D | Pinova | Modified resin from pine/conifer | ok | ok | - | - | - |

Fig. 3A

BIO-BASED POLYELECTROLYTE COMPLEX COMPOSITIONS WITH INCREASED HYDROPHOBICITY COMPRISING FATTY COMPOUNDS

This application is the continuation of International Application No. PCT/SE2017/050851, filed 24 Aug. 2017, which claims the benefit of Swedish Patent Application No. SE 1651136-2, filed 24 Aug. 2016, and Swedish Patent Application No. SE 1651137-0, filed 24 Aug. 2016, the entire contents of which are hereby incorporated by reference.

FIELD OF THE INVENTION

The present invention relates to bio-based polyelectrolyte complex (PEC) compositions which are environmentally benign, renewable and biodegradable. The PEC compositions comprise chitosan as a cationic polymer, an anionic polymer being represented by polyanions derived from nature, especially polysaccharides, and one or more additives.

The PEC compositions according to the present invention are suitable as binders for fiber based materials, textiles, woven and nonwoven materials. The treatment of fiber based materials, textiles, woven and nonwoven materials with the PEC composition of the present invention provide materials which have higher dry and/or wet strengths, i.e. higher dry and/or wet tensile indexes. Thanks to the one or more additives they contain, the PEC compositions of the present invention can transfer specific properties of the additives to the treated materials, such as hydrophobicity.

BACKGROUND INFORMATION

PECs are the association complexes formed between oppositely charged particles such as polymer-polymer, polymer-drug and polymer-drug-polymer. These complexes are formed due to electrostatic interaction between oppositely charged polyions and thereby avoids the use of chemical cross linking agents (S. Lankalapalli, 2009). Based on origin PECs are classified as natural polyelectrolytes, synthetic polyelectrolytes and chemically modified biopolymers.

The PEC composition according to the present invention comprises organic molecules of biological origin (i.e. biopolymers) represented by polyanions derived from nature which are either natural polyelectrolytes or chemically modified biopolymers. Hence, the PECs do not comprise synthetic polymers and synthetic polyelectrolytes and therefore the PEC compositions according to the present invention are bio-based PEC compositions.

EP0723047 relates to PEC suspensions for papermaking. However, the PEC suspensions do not comprise chitosan as a cation. Instead the cation is a synthetic polymer such as a copolymer of acrylamide with diallyldimethylammonium chloride. Hence, the PECs in EP0723047 are not bio-based PECs. More importantly, there is no data or reference to (i) any increase in wet strength of treated materials, (ii) effect on tensile stiffness of treated materials, and/or (iii) stability of the PECs over a period of several months.

EP1918455 relates to producing fibrous webs by using PECs having a negative net charge. Furthermore, the PECs do not comprise chitosan as a cation. Instead the cation is a synthetic polymer such as acrylic polymers, polyacrylamides and amido-amine polymers. Consequently, the PECs according to EP1918455 are not bio-based.

U.S. Pat. Nos. 8,993,505, 9,012,389 and 9,273,220 relate to PECs for reduced soiling tendency, reduced cleaning effort and reducing microbial challenge. However, the PECs are not wholly of biological origin since they in addition to biopolymers also comprise synthetic polymer such as (i) homopolymer of diallyl dimethyl ammonium chloride "DADMAC" disclosed in claim 1 of U.S. Pat. No. 8,993,505, (ii) homopolymer of acrylic acid or a random copolymer of acrylic acid disclosed in claim 1 of U.S. Pat. No. 9,012,389, (iii) homo- or copolymers of the following anionic monomers: acrylic acid, methacrylic acid, maleic acid, maleic anhydride, itaconic acid, styrene sulfonic acid and acrylamide propane sulfonic acid disclosed in U.S. Pat. No. 9,273,220. Consequently, the PECs according to U.S. Pat. Nos. 8,993,505, 9,012,389 and 9,273,220 are not bio-based. More importantly, there are no data or reference to (i) any increase in dry strength and wet strength of treated materials, (ii) effect on tensile stiffness of treated materials, and/or (iii) stability of the PECs over a period of several months. Hence, none of U.S. Pat. Nos. 8,993,505, 9,012,389 and 9,273,220 have the same purpose or aim as the present invention.

US2013216592 relates to a PEC consisting of biopolymers. However, the PECs are in the form of particles and not in solution More importantly, there are no data or reference to (i) any increase in dry strength and wet strength of treated materials, (ii) effect on tensile stiffness of treated materials, and/or (iii) stability of the PECs over a period of several months. Hence, US2013216592 does not have the same purpose or aim as the present invention.

U.S. Pat. No. 6,936,746 relates to PEC solid material systems. Hence, the PECs are in the form of solid materials and not as solutions. Moreover, U.S. Pat. No. 6,936,746 is silent about the net charge of the PECs. Furthermore, U.S. Pat. No. 6,936,746 is also silent about the charge ratio between the cationic polymer and the anionic polymer. More importantly, there is no data or reference to (i) any increase in dry strength and wet strength of treated materials, (ii) effect on tensile stiffness of treated materials, and/or (iii) stability of the PECs over a period of several months. Hence, U.S. Pat. No. 6,936,746 does not have the same purpose or aim as the present invention.

Furthermore, specific embodiments of PEC composition described in the prior art have a concentration of 0.04% PEC due to stability issues. Hence there is also a need for PEC composition having a higher concentration of PEC.

OBJECT OF THE INVENTION

It is an object of the present invention to overcome the drawbacks and disadvantages of the above described compositions and to provide a bio-based PEC composition that is environmentally benign, renewable and biodegradable.

A further object of the present invention is to transfer hydrophobicity to materials treated with a PEC composition.

A further object of the present invention is to transfer mechanical properties (dry strength, wet strengths, tensile stiffness and/or tensile softness) to materials treated with a PEC composition.

A further object of the invention is to provide a bio-based PEC composition which is stable for at least 1.5 months.

A further object of the invention is to provide a bio-based PEC composition comprising at least 0.04%, preferably at least 1.5 wt % PEC, more preferably at least 4 wt % PEC, most preferably 4-10 wt % PEC.

A further object of the invention is to provide a bio-based PEC composition which does not mold.

A further object of the invention is to provide a bio-based PEC composition which comprises an anionic biopolymer which has a low cost.

A further object of the invention is to provide a bio-based PEC composition which is suitable as a binder for fiber based materials, textiles, woven and nonwoven materials, and for pulp, paper and paperboard.

A further object of the invention is to provide a bio-based PEC composition which is stable in tap water. According to prior art, minerals in water destabilizes the PEC.

A further object of the invention is to provide a bio-based PEC composition which transfers specific properties from additives, such as wet tensile strength, hydrophobicity, etc. to fiber based materials, textiles, woven and nonwoven materials.

A further object according to the invention is to provide a biopolymer PEC composition, wherein the nonwoven materials are mineral fibres such as glass or rock fibres.

A further object of the invention is to provide a method for preparing the above bio-based PEC compositions.

A further object of the invention is to provide fiber based materials, textiles, woven and nonwoven materials which have (i) hydrophobicity and (ii) high wet tensile strength, and/or (iii) high dry tensile strength and/or (iv) softness and/or (v) stiffness.

Any combination of the above objects is also possible.

SUMMARY OF THE INVENTION

The objects of the invention are attained by a bio-based PEC composition comprising cationic biopolymer, anionic biopolymer, acid and a preservative. The expression bio-based indicates that the PEC composition is of biological origin.

The PEC composition of the present invention comprises also one or more fatty compounds. By fatty compounds is herein understood any oil, fat, wax and other hydrophobic compound with density lower than 1 g/cm$^3$ (i.e. which floats on water).

The PEC composition of the present invention may further comprise one or more additives.

While the PEC composition is of biological origin, the fatty compounds and the additives can be, independently of each other, of natural, semi-synthetic or synthetic origin.

The net charge of the PEC composition is cationic and the charge ratio between the anionic polymer and the cationic polymer is 1. Moreover, the weight ratio between cationic polymer and anionic polymer is 1:0.1 to 1:20. Ratios in the present invention are weight ratios unless otherwise indicated.

The PEC composition according to the present invention comprises chitosan which imparts higher tensile index when compared to other cations such as cationic starch and cationic cellulose. Hence, the preferred embodiments of the invention comprise cationic chitosan as cationic biopolymer. The concentration of chitosan in the composition is 0.005-30%. Moreover, chitosan preferably has a degree of deacetylation which ranges from 66%-100%. The degree of deacetylation is important for the physical properties of chitosan in the PEC composition.

The anionic biopolymer being a polyanion derived from nature can be selected from lignin alkali, lignosulfonic acid, or a polysaccharide, such as carboxymethyl cellulose (CMC), alginic acid (preferably the sodium salt), xanthan gum, pectin, carrageenan and nanocrystalline cellulose (NCC) and gum arabic. Lignin alkali and lignosulfonic acid may preferably be in the form of their sodium salt. The concentration of anionic biopolymer in the composition is 0.005-30 wt %. Concentrations in % in the present invention are concentrations in weight % unless otherwise indicated.

The pH of the PEC composition is below pH 7 and this may be achieved by Brønsted acid and/or a Lewis acid. Preferably, the pH of the PEC composition is lower than 6.5. Brønsted acids are selected from any organic or inorganic acids, wherein the concentration of the acid is 0.01-30 wt %. Lewis acids are selected from any cationic mono- or multivalent atom, wherein the concentration of the Lewis acid is 0.01-30 wt %. The PEC composition preferably has a pH value of 2-4, The weight ratio between the cationic polymer and the acid is 1:0.01 to 1:30 in the PEC composition. The acid of the PEC composition is selected from one or more of acetic acid, acetylsalicylic acid, adipic acid, benzenesulfonic acid, camphorsulfonic acid, citric acid, dihydroxy fumaric acid, formic acid, glycolic acid, glyoxylic acid, by acid, lactic acid, malic acid, malonic acid, maleic acid, mandelic acid, oxalic acid, para-toluenesulfonic acid, phtalic acid, pynivic acid, salicylic acid, sulfuric acid, tartaric acid and succinic acid, more preferably citric acid, oxalic acid and tartaric acid, even more preferably citric acid, and most preferably citric acid monohydrate.

The concentration of the PEC in the PEC composition is at least 0.04 wt % PEC, preferably at least 1.5 wt % PEC, more preferably at least 4 wt % PEC, most preferably 4-10 wt % PEC. Furthermore, the PEC composition according to the present invention is dilutable. Manufacturing of high concentrated PEC compositions is advantageous in view of lowering shipping cost, i.e. the PEC composition can be prepared with a high concentration and then diluted after shipping by the user or customer.

The solvent of the PEC composition is water selected from distilled water, tap water, and deionized water. PEC compositions comprising chitosan are known in the prior art for being unstable in tap water and are therefore prepared in distilled water. However, the PEC to compositions according to the present invention are stable in tap water.

The PEC composition of the present invention may also be prepared in neat form, i.e. the PEC composition does not comprise added water.

The preservative may be selected from one or more of fungicide, bactericide, pharmaceutical preservative, cosmetic preservative and food preservatives. The concentration of the preservative is 0.005-10 wt %, preferably 0.005-1.5 wt %, more preferably 0.005-0.5 wt %. Moreover, the preservative is preferably biodegradable and/or renewable. Food preservatives, pharmaceutical preservatives and cosmetic preservatives are preferred since they are non-toxic. The inclusion of a preservative helps to inhibit the growth of mold in the PEC composition. Moreover, we have discovered that PEC compositions without preservative becomes more yellow/brown than a composition comprising preservative. Even if performance is the same between the more yellow and less yellow PEC composition, the yellow color is transferred to material and causes yellowing which is unwanted especially for nonwovens and fiber based materials such as textiles.

The PEC composition of the present invention comprises one or more fatty compounds. The fatty compounds in the PEC composition comprise fat and/or oil and/or fatty acid. The composition's ability to incorporate and transport the fatty compounds gives the opportunity of transferring the hydrophobic properties of named fatty compounds to different materials treated with the PEC composition. This ability is explored by the present invention.

The fatty compounds of the present invention may be present in the PEC composition at a weight ratio of PEC: fatty compound of 1:0.01 to 1:50, preferably 1:0.05 to 1:20, more preferably 1:0.1 to 1:10, most preferably 1:0.5 to 1:1.

The one or more fatty compounds according to the present invention are independently of each other selected from the group consisting of natural oil, synthetic oil, liquid wax, liquid resin, fatty acid, fatty alcohol, fatty silanes, fatty siloxanes, fatty amine, fatty amide, fatty epoxide, fatty imine, fatty aldehyde, fatty imide, fatty thiol, fatty sulfate, fatty ester, fatty ketone, other types of lipids; preferably selected from natural oil, wax and/or fatty acid, and mixtures thereof.

The natural oil may be a vegetable oil, preferably selected from the group consisting of sunflower oil, soy bean oil, corn oil, cottonseed oil, palm oil, oleine palm oil, palm kernel oil, tall oil, *pine* oil, peanut oil, rapeseed oil, safflower oil, sesame oil, rice bran oil, coconut oil, *canola* oil, avocado oil, olive oil, linseed oil, grape seed, groundnut oil, rice bran oil, *perilla* oil, tsubaki oil, hemp seed oil, tung oil, kapok oil, tea seed oil, almond oil, *Aloe vera* oil, apricot kernel oil, *baobab* oil, *calendula* oil, corn oil, evening primrose oil, grape oil, grape seed oil, hazelnut oil, *jojoba* oil, *macadamia* oil, natural oils, neem oil, non-hydrogenated oils, partially hydrogenated oils, sesame oil, or similar, epoxidized vegetable oils such as epoxidized soya bean oil, epoxidized fatty acid methyl esters, preferably selected from sunflower oil, soy bean oil, tall oil, corn oil, rapeseed oil, coconut oil and palm oil, and more preferably from sunflower oil, and mixtures thereof.

The natural oil may as well be an essential oil, preferably selected from the group consisting of oils extracted from Aniseed, Basil, *Benzoin*, Bergamot, Black Pepper, Camphor, Carrot, Cedarwood, Chamomile German, Chamomile Maroc, Chamomile Roman, Cinnamon Leaf, Clove Buds, Cypress, Dill, *Eucalyptus globulus*, Fatigue, Fennel, Frankincense, Ginger, Grand Fir, Grapefruit, Grapeseed, Hazel, Hyssop, *Jojoba, Juniper, Juniper* Berry, Lavender, Lemon, Lemon Grass, *Melissa*, Mountain Savoury, Myrtle Red, Neroli, *Niaouli*, Patchouli, Peppermint, *Pine*, Red Myrtle, Rescue Remedy, *Rose geranium*, Rosemary, Sandlewood, Spanish Marjoram, Sweet Marjoram, Sweet Thyme, *Tagetes*, Tea Tree, Thyme Red, Thyme Sweet, Ylang Ylang, and mixtures thereof.

The natural oil may be an animal oil, preferably selected from the group consisting of animal fat or oil, sperm oil, lard, tallow, fish or whale oil, fish liver oil, milk fat, wool oil, wool grease, lanolin, bone oil, lard oil, goose grease, preferably selected from fish oil and bone oil, and mixtures thereof.

The natural oil may as well be a polymerized natural oil, preferably selected from any polymerized oil as described above, such as polymerized soy bean oil, and mixtures thereof.

The fatty compound may be a synthetic oil, preferably selected from the group consisting of pure or blends of light mixtures of high alkanes from a mineral source such as mineral oil, white oil, liquid paraffin, and liquid petroleum, full synthetic oil, poly-alpha-olefin (PAO) oil, Group V base oil, Group I-, II-, II+-, and III-type of mineral-base oil (as defined by API), semi-synthetic oil such as mixture of mineral oil and synthetic oil, preferably selected from liquid paraffin and mineral oil, most preferably from liquid paraffin, and mixtures thereof.

Furthermore, the fatty compound may be a liquid vegetable wax having a melting point below 40° C., preferably selected from the group consisting of beeswax, wool wax, insect secrete wax such as chinese wax, candellia wax, ozocerite, *Oryza sativa* (rice) bran wax, japan wax, carbowax, Fischer-Tropsch waxes, carnauba wax, ouricury wax, *jojoba* wax, *Jojoba esters*, vegetable wax (*Copernica cerifera*), cetyl esters, spermaceti. *Thembroma cacao* (*cocoa*) seed butter, palm wax, bayberry wax, castor wax, esparto wax, japan wax, rice bran wax, soy wax, tallow tree wax, and similar, preferably selected from bees wax, wool wax, candellia wax, carnauba wax, *jojoba* wax, palm wax, castor wax, and soy wax, and mixtures thereof.

The wax may as well be a liquid synthetic wax and/or petroleum wax having a melting point below 40° C., preferably selected from the group consisting of paraffin wax, montan wax, ceresin wax, ozocerite, peat wax, microcrystalline wax, and mixtures thereof.

When the fatty compound is a liquid resin, it may be a natural resin, preferably selected from the group consisting of *rosin* resin, methyl esters of *pine* resins, *pine* resins, tall resins, spruce resins, *rosin* resins, methyl esters of *rosin*, hydrogenated methyl esters of *rosin* resins, shellac, gum resins, oleo-resins, polyresin, and mixtures thereof.

The liquid resin may as well be a petroleum and/or synthetic resin, preferably selected from the group consisting of asphaltite, Utha resin, epoxy resins, methyl methacrylate, acetal resin, and mixtures thereof, wherein said resin is liquid at temperatures of 0° C.-35° C.

The fatty compound may be fatty acid. This can be a linear or branched C4-C40 carboxy acid, preferably selected from the group consisting of caproic acid, caprylic acid, capric acid, lauric acid, myristic acid, palmitic acid, stearic acid, arachidic acid, behenic acid, lignoceric acid, myristoleic acid, palmitoleic acid, oleic acid, octanoic acid, gadoleic acid, erucic acid, ricinoleic acid, linoleic acid, linolenic acid, licanic acid, clupanadonic acid, tall oil fatty acid, oleine palm, oleine soya, distilled or non-distilled soy bean oil fatty acid, distilled or non-distilled sunflower oil fatty acid, conjugated or non-conjugated sunflower oil fatty acid, more preferably selected from linoleic acid, palmitic acid Stearic acid, oleic acid, tall oil fatty acid, octanoic acid, ricinoelic acid, most preferably selected from linoleic acid, ricinoelic acid and oleic acid, and mixtures thereof.

The fatty acid may as well be in form of its corresponding salt, such as potassium palmate, potassium tallate, potassium cocoate, sodium palmate, sodium tallate, sodium cocoate, and mixtures thereof.

Moreover, the fatty acid may be a sorbitan fatty acid ester, preferably selected from the group consisting of sorbitan oleate, sorbitan laurate, sorbitan palmitate, sorbitan stearate, and mixtures thereof.

The fatty compound may be a linear or branched C4-C40 fatty alcohol, preferably selected from the group consisting of tert-butyl alcohol, tert-amyl alcohol, 3-methyl-3pentanol, ethchlorvynol, 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol (cluytyl alcohol, 1-octacosanol), 1-nonacosanol, myricyl alcohol (melissyl alcohol, 1-triacontanol), 1-dotriacontanol (lacceryl alcohol), geddyl alcohol (1-tetratriacontanol), cetearyl alcohol. The fatty alcohol may preferably be selected from lauryl alcohol, stearyl alcohol, oleyl alcohol, palmitoleyl alcohol, erucyl alcohol, cetyl alcohol, myristyl alcohol, ceryl alcohol and behenyl alcohol, more preferably from stearyl alcohol, oleyl alcohol, palmitoleyl alcohol, cetyl alcohol, ceryl alcohol and behenyl alcohol (due to low toxicity), and mixtures thereof.

The fatty compound may as well be a fatty silane, having at least one hydrophobic moiety and one to three hydrolysable alkoxy, hydroxy and/or halide groups respectively, wherein the hydrophobic moiety is selected from n-, iso, cyclic or mixtures thereof of C1-C30 saturated or unsaturated carbon chains, and wherein the alkoxy group is an alkoxy group comprising 1-4 carbon atoms, preferably selected from the group consisting of acetoxy, methoxy, ethoxy, propoxy, or butoxy. The fatty silane may be selected from the group consisting of methyltrialkoxy silane, potassium methyl siliconate, propyltriethoxy silan, butyl triethoxy silane, hexyltriethoxy silane, octyltriethoxy silane, dodecyltrimethoxy silane, hexadecyltrimethoxy silane, hexadecyltriethoxy silane, octadecyltrimethoxy silane, octadecyltriethoxy silane, preferably selected from octyltriethoxy silane and hexadecyltrimethoxy silane, and mixtures thereof.

The fatty compound may be a fatty siloxane having a polydimethylsiloxane backbone, functionalized with one or more organofunctional groups selected from the group consisting of hydroxy, epoxy, amine, amide, aldehyde, carboxy, thiol, ether, ester, oxime, imine, cyanate, blocked isocyanate, urethane, alkyl, alkene, alkyn, aryl, acetoxy, methoxy, ethoxy, propoxy(for example n-propoxy, isopropoxy) or butoxy groups. The fatty siloxane may as well be selected from the group consisting of reactive or non-reactive aminosiloxane, polydimethylsiloxane, alkylaminosiloxane, ethylphenyl-polydimethylsiloxane, hydroxyterminated polydimethylsiloxane, hexadecyl N-ethylaminpropyl polydimethylsiloxane, octyl N-ethylaminpropyl polydimethylsiloxane, hexadecyl aminpropyl, polydimethylsiloxane, hexadecylpolydimethylsiloxane, hexadecylpolydimethylsiloxane, and mixtures thereof, more preferably from hexadecyl modified aminosiloxane.

Additionally, the fatty compound may be a fatty amine, fatty amide, fatty epoxide, fatty imine, fatty aldehyde, fatty imide, fatty thiol, fatty sulfate, fatty ester, or fatty ketone, having a linear and/or branched chain comprising 4 to 40 carbon atoms, said chain being saturated or unsaturated with one or more double and/or triple bonds, and mixtures thereof.

Furthermore, the fatty compound may be other type of lipid, such as phospholipid, glyceride, triglyceride, glycolipid, wherein said phospholipid is preferably lecithin, wherein said triglyceride contains at least one of the fatty acids of claim 26, and mixtures thereof.

It is obvious to the person skilled in the art, that the one or more fatty compounds according to the present invention may be independently of each other selected from one or more of the above listed categories and under-categories of compounds.

The PEC composition may further comprise one or more additives selected from e fat soluble plasticizer, water soluble plasticizer, defoamer, foaming agent, wetting agent, coalescent agent, catalyst, surfactant, emulsifier, conservative, cross-linker, rheology modifier, filler, nonionic polymer, dye, pigment. Said additives are selected depending on the application method and the expected properties of the final material, wherein the concentration of the additive is 0-99 wt %, preferably 0-50 wt %, most preferably 0-30 wt %.

The composition can additionally comprise an acid or basic catalyst which has in particular the role of adjusting the temperature at which crosslinking begins. The catalyst can be chosen from Lewis bases and acids, such as clays, colloidal or noncolloidal silica, organic amines, quaternary amines, metal oxides, metal sulphates, metal chlorides, urea sulphates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate. Preferably, the catalyst is sodium hypophosphite, sodium phosphite and the mixtures of these compounds.

The amount of catalyst introduced into the composition can represent up to 20 wt %, preferably up to 10%, and advantageously is at least equal to 1%.

In a preferred embodiment of the invention, the PEC composition comprises chitosan, CMC and citric acid. The PEC composition may comprise 0.75-6 wt % chitosan, 0.75-6 wt % CMC and 6-30 wt % citric acid monohydrate. The fatty compound preferably comprises a natural oil, fatty acid and/or lecithin. The fatty acid preferably comprises tall oil fatty acids, octanoeic acid, oleic acid, olein palm, oleine soya, soy bean oil fatty acid, sunflower oil fatty acid, conjugated sunflower oil fatty acid, sorbitan oleate, potassium palmate, potassium tallate, potassium cocoate, soy lecithin, polysorb ID46, isosorbide ester, methyl ester of *rosin* and/or hydrogenated methyl ester of *rosin*. The natural oil preferably comprises vegetable oil (optionally epoxidized) and the most preferred vegetable oils comprise sunflower oil, high oleic sunflower oil, rapeseed oil, castor oil, and/or soy bean stand oil and/or soy bean oil.

In an embodiment of the invention, the PEC composition comprises 0.75-4 wt % chitosan, 0.75-4 wt % CMC and 6-24 wt % citric acid monohydrate. The fatty compound preferably comprises a natural oil, fatty acid and/or lecithin. The fatty acid preferably comprises tall oil fatty acids, octanoeic acid, oleic acid, olein palm, oleine soya, soy bean oil fatty acid, sunflower oil fatty acid, conjugated sunflower oil fatty acid, sorbitan oleate, potassium palmate, potassium tallate, potassium cocoate, soy lecithin, polysorb ID46, isosorbide ester, methyl ester of *rosin* and/or hydrogenated methyl ester of *rosin*. The natural oil preferably comprises vegetable oil (optionally epoxidized) and the most preferred vegetable oils comprise sunflower oil, high oleic sunflower oil, rapeseed oil, castor oil, and/or soy bean stand oil and/or soy bean oil.

In an embodiment of the invention, the PEC composition comprises 0.75-2 wt % chitosan, 0.75-2 wt % CMC, 9-12 wt % citric acid monohydrate, and 0.75-2 wt % fatty compound. The fatty compound preferably comprises a natural oil, fatty acid and/or lecithin. The fatty acid preferably comprises tall oil fatty acids, octanoeic acid, oleic acid, olein palm, oleine soya, soy bean oil fatty acid, sunflower oil fatty acid, conjugated sunflower oil fatty acid, sorbitan oleate, potassium palmate, potassium tallate, potassium cocoate, soy lecithin, polysorb ID46, isosorbide ester, methyl ester of *rosin* and/or hydrogenated methyl ester of *rosin*. The natural oil preferably comprises vegetable oil (optionally epoxidized) and the most preferred vegetable oils comprise sunflower oil, high oleic sunflower oil, rapeseed oil, castor oil, and/or soy bean stand oil and/or soy bean oil.

In an embodiment of the invention, the PEC composition comprises 0.75 wt % chitosan, 0.75 wt % CMC, 9 wt % citric acid monohydrate, and 0.75 wt % fatty compound. The fatty compound preferably comprises a natural oil, fatty acid and/or lecithin. The fatty acid preferably comprises tall oil fatty acids, octanoeic acid, oleic acid, olein palm, oleine soya, soy bean oil fatty acid, sunflower oil fatty acid, conjugated sunflower oil fatty acid, sorbitan oleate, potassium palmate, potassium tallate, potassium cocoate, soy lecithin, polysorb ID46, isosorbide ester, methyl ester of *rosin* and/or hydrogenated methyl ester of *rosin*. The natural oil preferably comprises vegetable oil (optionally epoxidized) and the most preferred vegetable oils comprise sunflower oil, high oleic sunflower oil, rapeseed oil, castor oil, and/or soy bean stand oil and/or soy bean oil.

In an embodiment of the invention, the PEC composition comprises 2 wt % chitosan, 2 wt % CMC, 12 wt % citric acid monohydrate, and 2 wt % fatty compound. The fatty compound preferably comprises a natural oil, fatty acid and/or lecithin. The fatty acid preferably comprises tall oil fatty acids, octanoeic acid, oleic acid, olein palm, oleine soya, soy bean oil fatty acid, sunflower oil fatty acid, conjugated sunflower oil fatty acid, sorbitan oleate, potassium palmate, potassium tallate, potassium cocoate, soy lecithin, polysorb ID46, isosorbide ester, methyl ester of *rosin* and/or hydrogenated methyl ester of *rosin*. The natural oil preferably comprises vegetable oil (optionally epoxidized) and the most preferred vegetable oils comprise sunflower oil, high oleic sunflower oil, rapeseed oil, castor oil, and/or soy bean stand oil and/or soy bean oil.

The objects of the invention are also attained by a method of preparing the above disclosed embodiments of PEC compositions. The method comprises the steps of mixing chitosan, anionic polymer, acid, preservative, water and one or more fatty compounds. The method may comprise one or more homogenization steps.

In a preferred embodiment, the method comprises the steps of:
a) Adding the anionic polymer to water,
b) Adding chitosan to the resulting mixture in step a,
c) Mixing the acid with water, and adding the resulting acidic solution to the resulting mixture in step b,
d) Adding one or more fatty compounds to the resulting mixture in step c,
e) Adding a preservative to the resulting mixture in d, and wherein the resulting mixtures in steps a-e are mixed and optionally homogenized.

The objects of the invention are also attained by using the above disclosed embodiments of PEC compositions as a binder for fiber based materials, textiles, woven and nonwoven materials. The use of the PEC composition is preferably for providing mechanical properties to said fiber based materials, textiles, woven and nonwoven materials, and wherein said mechanical properties are selected from dry strength, wet strengths, tensile stiffness and tensile softness The objects of the invention are also attained by fiber based materials, textiles, woven and nonwoven materials comprising the above disclosed embodiments of PEC compositions as a binder.

The objects of the invention are also attained by an apparatus comprising the above disclosed embodiments of PEC compositions as a binder. The apparatus is any kind of laboratory or industrial equipment using low or high shear forces for producing the PEC compositions. This might be a magnet stirrer, overhead stirrer with propeller or disperser or like, homogenizer with or without high pressure, in-line or external homogenizers, extruders, shaking equipment, mortar and pestle, blender type of instrument, any kind of mixer (static mixer, micro mixer, vortex mixer, industrial mixer, ribbon blender, V blender, continuous processor, cone screw blender, screw blender, double cone blender, double planetary, high viscosity mixer, counter-rotation, double and triple shaft, vacuum mixer, high shear rotor stator, dispersion mixer, paddle, jet mixer, mobile mixer, drum mixer, intermix mixer, planetary mixer, Banbury mixer or like), French press, disintegrator, mill (grinding by bead mill, colloid mill, hammer mill, ball mill, rod mill, autogenous mill, semi-autogenous grindning, pebble mill, high pressure grinding rolls, buhrstone mill, vertical shaft impactor mill, tower mill or like), ultrasonic treatment, rotor-stator mechanical equipment, any kind or propeller or mixer, high temperature and/or high pressure bitumen emulsifiers or combinations of the above.

The objects of the invention are also attained by a method of treating fiber based materials, textiles, woven and nonwoven materials with the above disclosed embodiments of PEC compositions as a binder, comprising the steps of:
a. Treating the fiber based materials, textiles, woven and nonwoven materials with a PEC composition by
   i. addition to suspensions of fiber based materials, textiles, woven and nonwoven materials,
   ii. spray coating,
   iii. dip coating,
   iv. roll coating,
   v. impregnation,
   vi. padding,
   vii. screen coating,
   viii. printing,
   ix. direct coating methods including knife coating, blade coating, wire wound bar coating, round bar coating and foam coating (e.g. crushed foam coating), and like,
   x. indirect coating methods including mayer rod coating, direct roll coating, kiss coating, gravure coating and reverse roll coating,
   xi. ink jet and/or slit-die/slot-die, and like, and
b. optionally curing the treated cellulosic, textile, woven and nonwoven materials.

In a preferred embodiment, the method of treating comprises the step of curing the treated fiber based and nonwoven materials. In a further preferred embodiment, the curing is performed at 20° C. to 200° C., preferably at 80° C. to 190° C., more preferably at 120° C. to 180° C.

BRIEF DESCRIPTION OF THE DRAWINGS

FIGS. 1A-F Hydrophobicity vs stiffness after one wash according to Method 5 (see Experiment part) for different textiles treated with PEC:SO 1:0.5 with two different dilutions (1 part formulation to 1 part water or 1 part formulation to 4 parts water). Hydrophilic: drop stays <10 s on the surface. Hydrophobic: drop stays >60 s on the surface. "Neither hydrophilic nor hydrophobic": drop stays 10-30 s.

FIGS. 3-3A Hydrophobicity transfer from different fatty compounds added to the PEC-system (OC). Emulsions prepared according to Method 1 (see Experiment part) to create the ratio PEC:fatty compound 1:0.5. Hydrophobicity tested on 100% viscose nonwoven treated with the binders according to Method 5. Grades for hydrophobicity (according to Method 6): – –=hydrophilic and spreading, –=hydrophilic, +=droplet stays around 1 s, ++=droplet stays 10-30 s, +++=droplet stays 60 s

DETAILED DESCRIPTION OF THE PREFERRED EMBODIMENTS

Figure 1B:
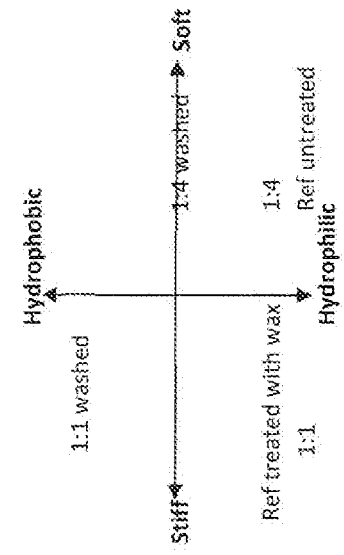

The present invention relates to bio-based PEC compositions that are environmentally benign, renewable and biodegradable mixtures of a cationic biopolymer and an anionic biopolymer. The cationic and anionic polymers are balanced so that the net charge of the PEC is cationic. The PEC compositions are prepared in the presence of an acid and preservative and further comprise one or more fatty compounds. The PEC compositions are suitable as binders for fiber based materials, textiles, woven and nonwoven materials, as well as hydrophobic surface treatment of said materials or as additives in wet end paper making.

According to the invention the use of the wording textiles, woven and nonwoven may include cloths or fabrics and may be based on natural or synthetic fibers and mixtures thereof. Textiles, woven and nonwoven may consist of a network of natural and/or synthetic fibers often referred to as thread or yarn. Yarn is produced by spinning raw fibers of wool, flax, cotton, or other material to produce long strands. Textiles are formed by weaving, knitting, crocheting, knotting, or pressing fibers together (felt). The words fabric and cloth may for example be used in textile assembly trades (such as tailoring and dressmaking) as synonyms for textile. Textile may refer to any material made of interlacing fibers or nonwoven textiles. Fabric refers to any material made through weaving, knitting, spreading, crocheting, or bonding that may be used in the production of further goods (garments, etc.). Cloth may be used synonymously with fabric but often refers to a finished piece of fabric used for a specific purpose (e.g., table cloth). The wording textiles, woven and nonwoven according to the present invention may include all different types of textiles described above. Textiles, woven and nonwoven according to the invention can be made from many different types of materials and fibers for example animal, plant, wood, mineral, synthetic, sugar based, protein based for example wool, silk, mohair, cashmere, pygora, cameldown, alpaca, ilama, vicuna, guanaco, angora, qiviut, ramie, nettle, milkweed, cotton, linen, flax, jute, hemp, viscose, asbestos, glass fiber, rock fiber, nylon, elastan, polyester, acrylic, polyamide, polypropylene, polyurethane and its derivatives, cornfiber, coir, yucca, sisal, bamboo (rayon) fiber, peanut, soybased, chitin based, milk casein based, keratin based and poly lactic acid based etc. Further, nonwoven materials are fabric-like materials made from long fibers, bonded together by chemical, mechanical, heat or solvent treatment. Nonwoven fabrics are also defined as sheet or web structures bonded together by entangling fiber or filaments (and by perforating films) mechanically, thermally or chemically. The term is used in the textile manufacturing industry to denote fabrics, such as felt, which are neither woven nor knitted. They are flat or tufted porous sheets that are made directly from separate fibers, molten plastic or plastic film.

Fiber based materials refer to materials such as paper materials which comprise a high degree of cellulose. As will be understood by those skilled in the present field of art, numerous changes and modifications may be made to the above described and other embodiments of the present invention, without departing from its scope as defined in the appending claims. For example, the pulps for making fiber based materials may be any kind of pulp, i.e. mechanical pulp, thermo-mechanical pulp, chemo-mechanical pulp, sulphate pulp, sulphite pulp, bleached pulp, unbleached pulp, short-fiber pulp, long-fiber pulp, recycled fibers, mixtures of different pulp grades etc. The invention works irrespective of the kind of pulp chosen.

The Examples relate to comparative studies for investigating the emulsifying and dispersion properties of the PEC compositions comprising different fat and oils compounds. Besides creating a good emulsion and/or dispersion, it is the object of these studies, to investigate the possibility to transfer the properties of the emulsified and/or dispersed compounds from the PEC composition to different materials.

The PEC composition of the present invention can be used as a vehicle in the sense that the composition both has space for and fuel to transport other molecules. In more specific terms, the PEC composition can form a micelle around for example fatty compounds contained in the PEC composition and thanks to its positive charge, it can thereafter arrange itself towards negatively charged fibers and thus transfer the properties of the fatty compounds to the fiber material.

EXPERIMENTAL SECTION

Charge Ratio

Charge density was measured using the Mütek PCD 02 device. Charge (symbol: q, unit: meqv) was calculated using Eq. 1.

$$q[\text{meqv}] = C_{counter\ ion}\ [\text{eqv/1}] \cdot V_{counter\ ion}\ [1] \cdot 1000 \quad (1)$$

where the counter ion is one of sodium polyethylenesulphate (PES-Na, anionic) or poly-diallyl-dimethyl-ammonium-chloride (poly-dadmac, cationic), depending on the charge of the colloid. If the charge at different concentrations are plotted against mass of the current colloid, the charge density (unit: meqv/g) is the slope of the linear curve. The mass of the colloid can be calculated with Eq. 2.

$$m\ [g\ colloid] = \text{wt}\%\ colloid\ [g\ colloid/g\ solution] \cdot g\ [g\ solution\ for\ 10\ ml] \cdot 0,0 \quad (2)$$

When the charge densities were known for one polycation and one polyanion, the charge ratio was calculated between the polyelectrolytes so that the overall charge of the complex became positive (i.e. charge ratio <1), see Eq. 3.

$$\text{Charge ratio} = \frac{[\text{part of complex} \ast \text{charge density}]_{polyanion}}{[\text{part of complex} \ast \text{charge density}]_{polycation}} \quad (3)$$

The method above is for measuring charge density and then calculate the charge ratio.

Experiments 1-12—Study of Various Fatty Compounds included in the PEC Composition and Evaluation of Said PEC Compositions on Nonwoven and Textiles A majority of the 100% bio based binders on the market are hydrophilic. To increase the market share for bio based binders, hydrophobicity must be included within the binder characteristics together with mechanical properties such as stiffness and/or softness and dry- and wet strength. The binder recipe OC-C (see details in abbreviations experiments 1-12) is based on polyelectrolyte complex (PEC). PEC gives good dry and wet mechanical properties to fiber based materials, nonwovens, paper and textiles. PEC can also be seen as a micelle that can emulsify for example fatty compounds. To mix PEC and fatty compounds can therefore lead to an emulsion/dispersion that both gives good mechanical properties to materials (the PEC part of the emulsion) and that creates a hydrophobic surface on the material (the fatty part of the emulsion).

The experiments below demonstrate that PEC can support and stabilize fatty compounds in water to form emulsions/dispersions. These are then further used as binders/additives on different materials and the properties measured. In the following examples the term fatty PEC composition refers to polyelectrolyte complex emulsion/dispersion containing a fatty compound while a polyelectrolyte complex formulation without fatty compounds is called non-fatty PEC composition Equipment used in Experiments 1-12
List of equipment used in experiments 1-12.
pH in formulations was measured with pHenomenal pH1000H from VWR with Hamilton Polilyte Lab Temp BNC electrode (calibrated with buffers pH 4, 7 and 10).
Tensile tests were conducted using Testometric M250-2.5AT (machine capacity 2.5 kN) together with Wintest Analysis software.
Homogenization of formulations in lab scale was done using IKA T25 digital Ultra-Turrax.
Viscosity of formulations were measured with Brookfield DV-II+ Pro LV
Viscometer together with Rheocal software using spindle LV4 at 200, 150, 100, 50, 10 and 6 rpm.
Coating of paper and nonwoven was performed with Wichelhaus WI-MU 505 A horizontal padder.
Drying of treated paper and nonwoven was done in an oven from Termaks (with stenter frame from Wichelhaus Wi-LD3642 Stenter). Drying of material pieces after wash was performed in a Termaks oven, suspended by clamps.
Washing was done in standardized machine Electrolux Wascator FOM71 CLS.
Visual evaluation of emulsions was conducted usinga Nikon Microphot—FXA with 10× lens.
Chemicals used in Experiments 1-12
Below, all chemicals used in experiments 1-12 are listed.

| Chemical name | Commercial name | Producer/Distributor |
| --- | --- | --- |
| 1,2-Benzisothiazol-3(2H)-one, 2-methyl-2H-isothiazol-3-one | Nipacide BSM | Clariant |
| Carboxymethyl cellulose | FinnFix 5 | CP Kelco |
| Castor oil | | Cargill |
| Chitosan | Chitosan 90/100/A1 | Kraeber |
| Chitosan | Chitosan | Zheijiang Aoxin Biotechnology |
| Citric acid monohydrate | Citronsyra Mono E33 8-80M LT | Univar AB |
| Epoxidized soy bean oil | Soyflex 6330 | Soyventis/Vendico |
| Hydrogenated methyl ester of rosin | Hercolyn D | Pinova |
| Isosorbid ester | Polysorb ID 46 | Roquette |
| Lecithin | Lechiprime 1000 IP | Cargill |
| Methyl ester of rosin | Abalyn | Pinova |
| Octanoic acid | | Acros organics |
| Oleic acid | | Alfa aeser |
| Polyol ester | Oxi-cure 2000 | Cargill |
| Potassium cocoate | Eurasol KPZ | EOC/IMCD |
| Potassium palmate | Eurasol PZT | EOC/IMCD |
| Potassium tallate | Eurasol KT | EOC/IMCD |
| Rapeseed oil | | ICA |
| Sorbitan laurate | Span 20 | Croda |
| Sorbitan oleate | Span 80 | Croda |
| Sorbitol | Neosorb 70 | Roquette |
| Soy bean stand oil | SEH 77 7P | Oleon/Vendico |
| Soy bean stand oil | SEH 77 30P | Oleon/Vendico |
| Sunflower oil | | ICA |
| Sunflower oil | Sunflower oil 745100 | AAK |
| Sunflower oil | | Cargill |
| Sunflower oil, high oleic | High oleic sunflower oil | Cargill |
| Tall oil fatty acid | Sylfat 2 | Arizona/IMCD |

Abbreviations in Experiments 1-12
Below, all abbreviations used in experiments 1-12 are listed.

C Chitosan
CMC Carboxymethyl cellulose
CO Castor oil
ESBO Epoxidized soy bean oil, Soyflex 6330
NW Nonwoven
OA Octanoic acid
OC-A (2 wt % chitosan 90/100/A1, 12 wt % citric acid mono hydrate, 0.2% Nipacide BSM, the rest is water) produced by dispersing chitosan in 73.8 wt % water and citric acid mono hydrate in 12 wt % water and pour the citric acid solution to the chitosan dispersion during homogenization. Homogenize for 10 min and add then the biocide. Homogenize 1 min more.
OC-B (0.75 wt % chitosan, 0.75 wt % Finnfix 5, 9 wt % citric acid mono hydrate, 25 wt % Neosorb 70, 0.2 wt % Nipacide BSM) Produced with method 14
OC-C (2 wt % chitosan 90/100/A1, 2 wt % Finnfix 5, 12 wt % citric acid mono hydrate, 0.2 wt % Nipacide BSM, the rest is water) Produced with method 12
OC-D (2 wt % chitosan 90/100/A1, 2 wt % Finnfix 5, 12 wt % citric acid mono hydrate, 2 wt % sunflower oil from ICA, 0.2 wt % Nipacide BSM, the rest is water) Produced with Method 13
OC-E (2 wt % chitosan 90/100/A1, 2 wt % Finnfix 5, 12 wt % citric acid mono hydrate, 2 wt % sunflower oil 745100 (from AAK), 0.2 wt % Nipacide BSM, the rest is water) Produced with Method 13
OC-F (2 wt % chitosan 90/100/A1, 2 wt % Finnfix 5, 12 wt % citric acid mono hydrate, 2 wt % sunflower oil (from Cargill), 0.2 wt % Nipacide BSM, the rest is water) Produced with Method 13
OC-G (2 wt % chitosan 90/100/A1, 2 wt % Finnfix 5, 12 wt % citric acid mono hydrate, 2 wt % high oleic sunflower oil (from Cargill), 0.2 wt % Nipacide BSM, the rest is water) Produced with Method 13
PEC Polyelectrolyte complex
RH Relative humidity
RO Rapeseed oil
RT Room temperature
S2 Tall oil fatty acid, Sylfat 2
SO Sunflower oil
PES Polyester
PLA Polylactic acid Methods Employed in Experiments 1-12

Below, all methods employed in experiments 1-12 are listed.

Method 1: 50 g formulation is homogenised with Ultra Turrax T25 with speed 9000 rpm during 1 minute after the addition of oil.

Method 2: Coating of nonwoven and fabric with padder with speed 11.6 and pressure 0.1 MPas. Drying in Termaks oven in a stenter frame in 150° C. for 3 minutes.

Method 3: Pictures taken through the ocular with the camera of the mobile phone LG G3. Lens in the microscope is 10×.

Method 4: A wash cycle with five washes in 40° C. standard program (Procedure No. 4N from ISO/CD 6330) with standard detergent (IEC(A)—2012: n. 6—containing optical brightener—pink label—detergent n. 3 in the standard) followed by drying in Termaks oven in 150° C. in 3 min between the washes was performed.

Method 5: Test of hydrophobicity by putting drops of water on the surface. Grades for hydrophobicity: −−=hydrophilic and spreading, −=hydrophilic, +=droplet stays around 1 s, ++=droplet stays 10-30 s, +++=droplet stays >60 s and is defined as hydrophobic.

Method 6: Formulations diluted to 1 wt % (based on dry content measured with Method 9) and nonwoven treated with padder with speed 11.6 and pressure 0.1 MPa followed by drying in stenter frame in Termaks oven 150° C. for 3 min, suspended with clothespins.

Method 7: Tensile test for dry nonwoven were performed by using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH. Three nonwoven sheets were treated and two test specimen for each treated piece was cut out and tested.

Method 8: Tensile test for wet nonwoven were performed by using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH and then soaked in water for 15 min. Three nonwoven sheets were treated and two test specimen for each treated piece was cut out and tested.

Method 9: Dry content was measured by putting three times 10 g of the formulation in aluminium cups in the Termaks oven for 20-24 h (105° C.). The theoretical dry content was then calculated by the equation (W2−W0)/W1 where W0=weight of the cup, W1=weight of the original sample, W2=weight of the cup and the final sample. Method 10: Formulations diluted to 1 wt % and nonwoven treated with padder with speed 11.6 and pressure 0.1 MPa followed by drying in stenter frame in stenter frame oven for different elevated temperatures and times.

Method 11: General description of production method for non-fatty PEC composition without oil/fat as additive (100 g formulation): 1. Homogenize 71.8 g water and 2 g CMC Finnfix 5 with Ultraturrax T25 at 9000 rpm for 3 min. 2. Disperse 2 g chitosan in the CMC-solution. 3. Dissolve 12 g citric acid mono hydrate in 12 g water and add to the biopolymer solution. Homogenize at 12000 rpm for 3 min. 4. Add 0.2 g Nipacide BSM. Homogenize 1 min.

Method 12: General description of production method for fatty PEC composition (100 g formulation): 1. Homogenize 69.8 g water and 2 g CMC Finnfix 5 with Ultraturrax T25 at 9000 rpm for 5 min. 2. Disperse 2 g chitosan in the biopolymer solution. 3. Dissolve 12 g citric acid mono hydrate in 12 g water and add to the CMC-solution. Homogenize at 12000 rpm for 5 min. 4. Add 2 g oil/fat to the mixture. Homogenize at 12000 rpm for 5 min. 5. Add 0.2 g Nipacide BMS. Homogenize 1 min.

Method 13: General description of production method for fatty PEC composition comprising a water soluble plasticizer (100 g formulation): 1. Homogenize 40 g water and 25 g Neosorb 70 for 2 min. 2. Add 0.75 g CMC Finnfix 5 and homogenize with Ultraturrax T25 at 9000 rpm for 5 min. 2. Disperse 0.75 g chitosan in the CMC-solution. 3. Dissolve 9 g citric acid mono hydrate in 24.3 g water and add to the biopolymer solution. Homogenize at 9000 rpm for 5 min. 4. Add 0.2 g Nipacide BSM. Homogenize 1 min.

Experiment 1—Study of the Emulsifying Properties of PEC

In experiment 1, oil or fatty acid was added to water solutions of CMC, chitosan or PEC respectively, to investigate the emulsifying properties of the different biopolymers. The ratio between PEC or polymer to oil are described in Table 1. The emulsions were prepared according to Method 1.

TABLE 1

Recipes for fatty PEC compositions

| Polymers and PEC used as emulsifier for the oil or fatty acid | Oil or Fatty acid | Ratio polymer or PEC to fatty compound | Stability at 23° C. |
|---|---|---|---|
| OC-A | Octanoic acid | C:OA 1:0.1 | Creaming < 1 day |
|  |  | C:OA 1:1 | Creaming < 1 day |
|  | Sunflower oil[1] | C:SO 1:0.1 | Creaming < 1 day |
|  |  | C:SO 1:1 | Creaming < 1 day |
| OC-C | Octanoic acid | PEC:OA 1:0.1 | Creaming < 1 day |
|  |  | PEC:OA 1:0.5 | Creaming < 1 day |
|  | Sunflower oil[1] | PEC:SO 1:0.05 | No Creaming within 7 day |
|  |  | PE:SO 1:0.5 | No Creaming within 7 day |
|  |  | PEC:SO 1:1 | Creaming within 5 day |
|  |  | PEC:SO 1:2 | Creaming within 5 day |
| 10 wt % FinnFix 5 | Sunflower oil | CMC:SO 1:1 | No emulsion formed |

[1]From ICA

Stable emulsions were obtained from PEC:SO 1:0.05 and PEC:SO 1:0.5. Microscopic evaluation of the PEC:SO 1:0.5 emulsion according to Method 3 shows an even particle size distribution containing small spherical emulsion droplets.

The emulsion of PEC:SO 1:0.5 was also tested by diluting it with water to see if sedimentation/precipitation/creaming/floating/phase inversion happened. The emulsion did not show any signs of separation within 7 days.

Experiment 2—Study of the Hydrophobicity Imparted by Fatty PEC Composition

Coating method 2 was used for applying fatty PEC compositions in table 1 on 100% viscose nonwoven material. The hydrophobicity was tested by putting droplets of water on the treated material. For OA with both C and PEC, the material was hydrophilic. For the ratios 1:0.1 of C:SO and PEC:SO the material was hydrophilic. For ratio PE:SO 1:0.5, 1:1 and 1:2 and C:SO 1:1 the materials got a hydrophobic character which further improved at after 5 days of treatment. Water droplets added to the mature hydrophobic material stayed on the surface until evaporated and were not absorbed.

CMC followed the same trend as C and PEC regarding development of the hydrophobicity over time. However, one week after treatment the droplets stayed on the surface for one minute but was thereafter absorbed by the material.

Experiment 3—Study of the Hydrophobicity Imparted by fatty PEC Composition through Contact Angle Measurements Static contact angle was measured on the 100% viscose nonwoven treated with PEC:SO 1:0.5. Formulation was produced according to Method 1 and the material was treated according to Method 2. The contact angle measurement was performed six days after treatment showing the following contact angles: 129.5°, 126.7°, 120.7°, 122.9°, 127.3° 118.0° and 124.3° yielding an average contact angle of 124.2°. Dynamic contact angle for the same material over a period of 60 s s is seen in Table 2.

TABLE 2

Dynamic contact angle for 100% viscose NW with PEC:SO 1:0.5 treated six days before the test.

| Test | Contact angle [°] | | |
|---|---|---|---|
|  | 1 s | 30 s | 60 s |
| 1 | 129.0° | 128.3° | 127.2° |
| 2 | 125.4° | 125.4° | 127.2° |
| 3 | 125.9° | 125.4° | 126.2° |

No contact angle could be measured on same nonwoven material treated with non-fatty PEC composition.

Experiment 4—Study of the Stability of the fatty PEC Compositions at 40° C. and 50° C.

OC-D produced according to Method 12 was stored at 40° C. and 50° C. A thin line of creaming was observed on the surface, however but the creaming was easily redispersed when stirred.

NW treated with OC-D that had been stored one month at 50° C. and one and a half month at 40° C. show the same hydrophobicity as freshly produced OC-D. NW was treated according to Method 2 and the hydrophobicity was evaluated according to Method 6 (see Table 3).

TABLE 3

Hydrophobicity for NW treated with aged formulations.

| Time and elevated temperature that OC-D was exposed to | Day 2 after treatment | Day 5 after treatment |
|---|---|---|
| 30 days in 50° C. | ++ to +++ [1] | +++ [3] |
| 45 days in 40° C. | +++ [2] | +++ [3] |
| Freshly produced OC-D | ++ to +++ [1] | +++ [3] |

[1] All drops gone after 60-70 s.
[2] Half the amount of drops are still on the surface after five minutes.
[3] All drops are still on the material after ten minutes and they are easily rolled off when the material is tilted.

No difference can be observed between the differently fresh and aged fatty PEC compositions of the invention.

Experiment 5—Study of the Washing Durability of the Hydrophobicity on NW Material Treated with PEC Composition To investigate if the oil in the PEC composition is covalently bounded the material it was tested to wash a piece of 100% viscose NW according to Method 4. The wash was performed 3 weeks after treatment with the PEC composition OC-D. The hydrophobicity was not affected by the washing.

Figure 1A:
Figure 2A:
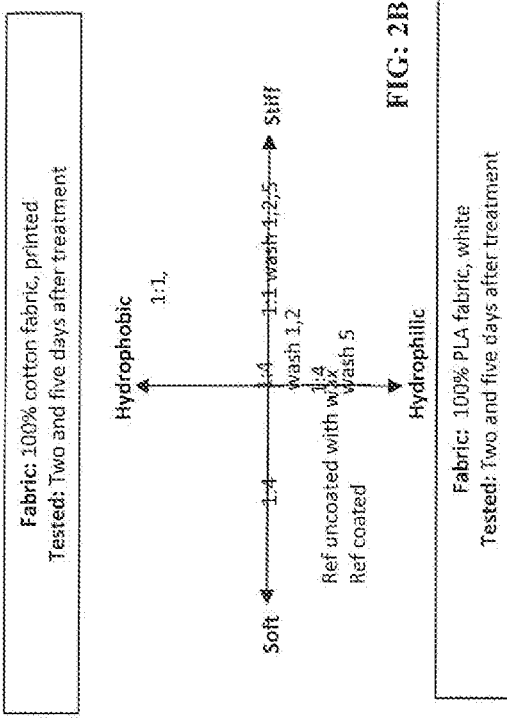
FIGS. 2A-J Hydrophobicity vs stiffness after one, two and five washes according to Method 5 (see Experiment part) for different textiles treated with PEC:SO 1:0.5 with two different dilutions (1 Part formulation to 1 part water or 1 part formulation to 4 parts water). Hydrophobic: drop stays > 60 s on the surface. "Neither hydrophilic nor hydrophobic": drop stays 10-30 s.
Figure 2B:
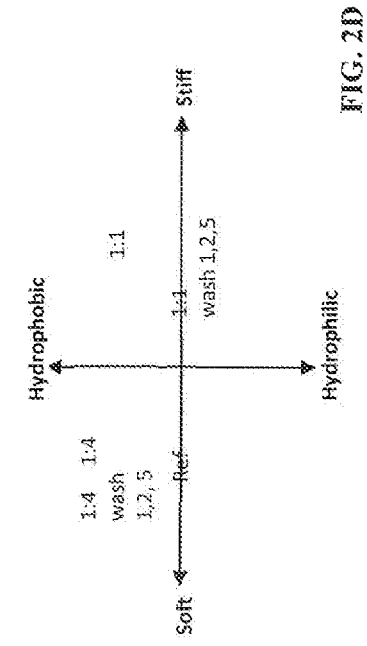
Figure 2C:
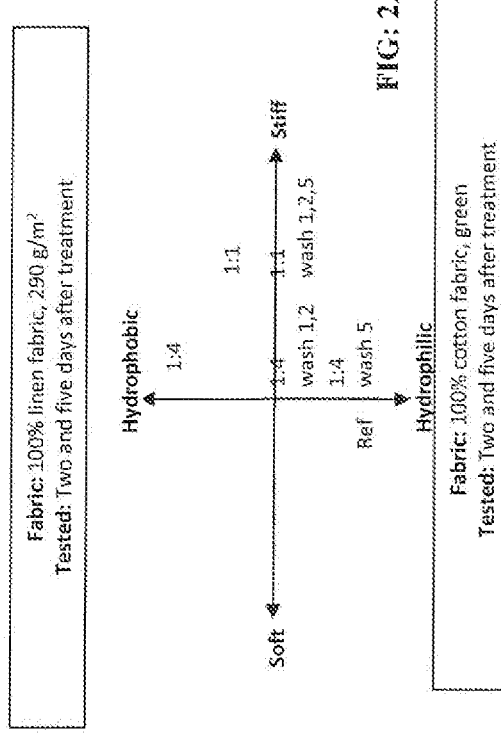
Figure 2D:
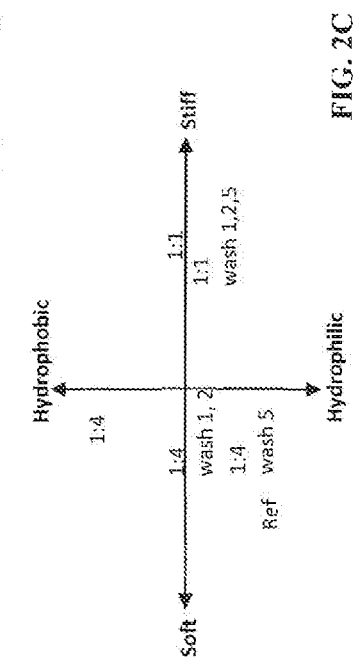
Figure 2E:
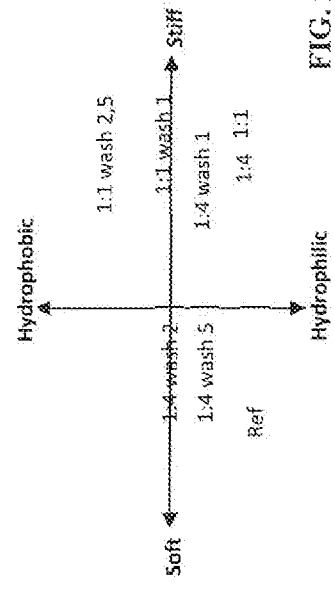
Figure 2F:
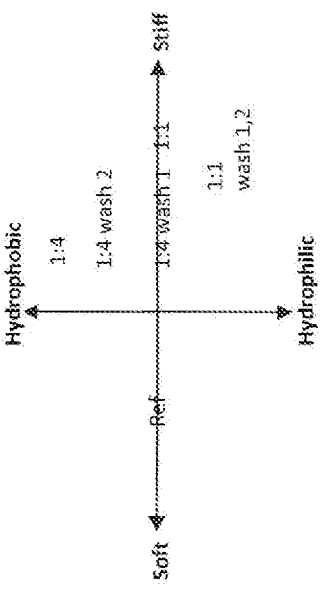
Figure 2G:
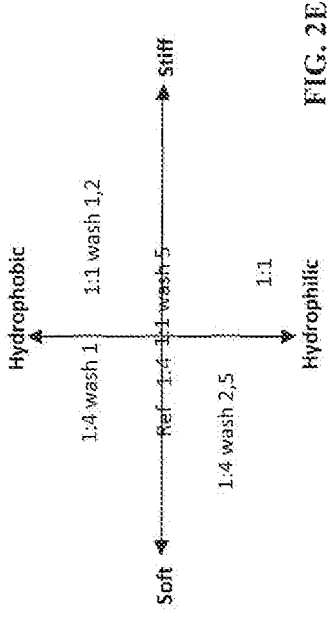
Figure 2H:
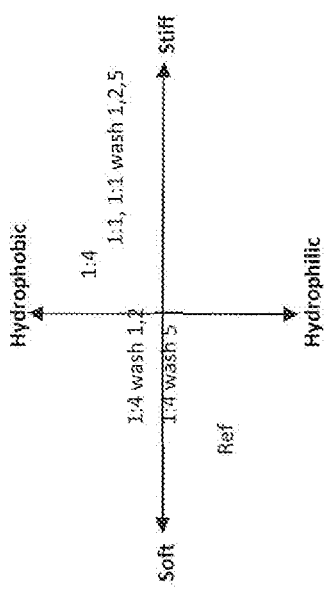
Figures 2I, 2J:
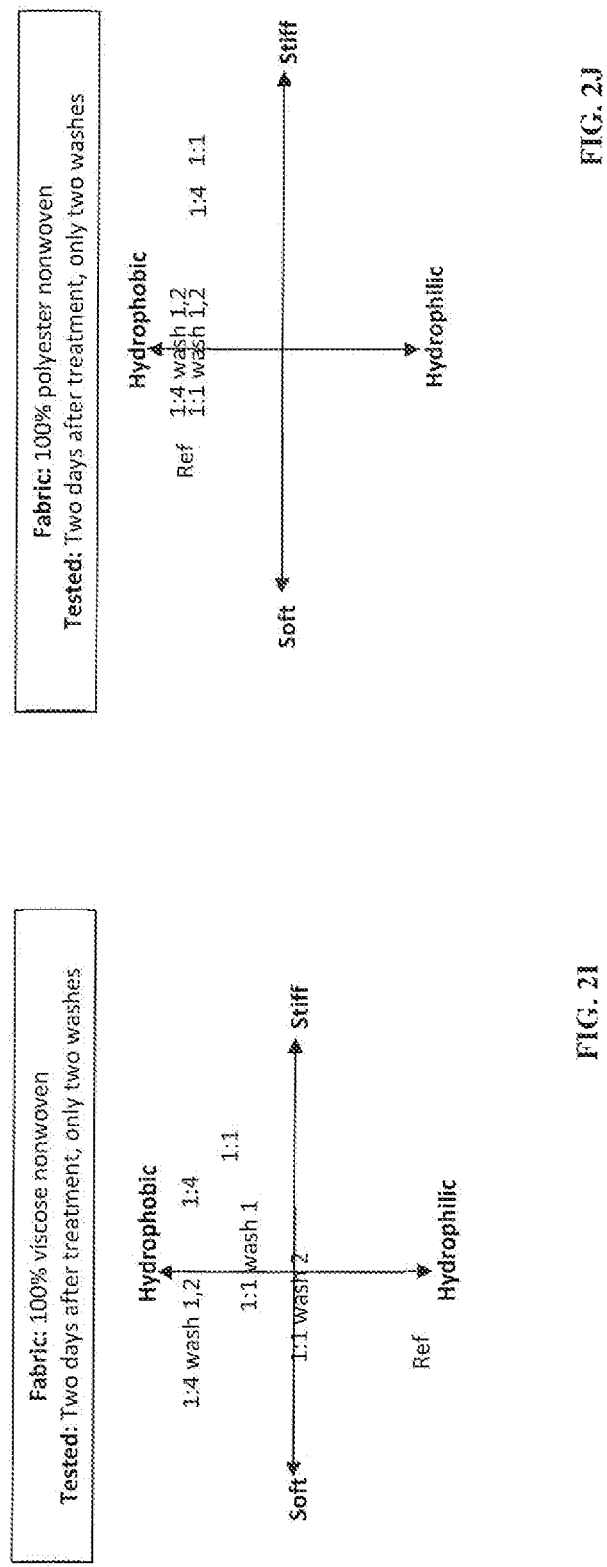

Experiment 6—Hydrophobizing Performance and Durability of Fatty PEC Composition on Different Materials To investigate if fatty PEC composition OC-D transfers hydrophobicity to different types of fibres, and not only viscose as tested above, a test was performed applying OC-D according to Method 2 on the following textiles and NWs 1. 100% hemp plain weave, 203 $g/m^2$, textile
2. 100% cotton sateen, white, 145 g/m2textile
3. Printed cotton, different colors, textile 100% polyester, white, textile
4. 100% PLA, white, textile
5. 100% polyester, white, nonwoven, The pieces were treated with diluted OC-D, either 1 part OC-D+1 part water (called 1:1) or 1 part OC-D and 4 parts water (called 1:4) and coated according to Method 2. See hydrophobicity results (before and after washing according to Method 4) in Table 4 and hydrophobicity vs stiffness in FIG. 1.

TABLE 4

Hydrophobicity on materials treated with 1:1 or 1:4 dilutions of OC-D after washing according to Method 4. The hydrophobicity was evaluated according to Method 5.

| Material and the dilution (OC-D: water) used | Before wash | After 1 wash |
|---|---|---|
| Cotton textile, sateen, reference | + |  |
| Cotton textile, sateen, 1:4 | ++ | +++ |
| Cotton textile, sateen 1:1 | − | +++ |
| Cotton textile, printed, reference | − |  |
| Cotton textile, printed 1:4 | − | ++ |
| Cotton textile, printed 1:1 | − | +++ |
| PLA textile, reference | ++ |  |
| PLA textile 1:4 | +++ | +++ |
| Polyester textile, reference | − |  |
| Polyester textile, white 1:4 | +++ | +++ |
| Polyester textile, white 1:1 | +++ | +++ |
| Hemp textile, reference | −− |  |
| Hemp textile 1:4 | − | + |
| Hemp textile 1:1 | − | ++ |
| Polyester NW, reference | +++ |  |
| Polyester NW 1:4 | +++ | NA [1] |

[1] NW not washed since NW falls apart more easily than textiles

The study shows that fatty PEC composition OC-D is compatible with various textiles since they become hydrophobic and stiff and that the hydrophobicity remains after wash.

After the above presented test, a broader material study was undertaken using 5 washing cycles according to Method 4. See the results in Table 5. Hydrophobicity in relation to stiffness is shown in FIG. 2.

TABLE 5

Different textiles and nonwovens treated with PEC composition OC-D and washed according to Method 4. The hydrophobicity was evaluated according to Method 5.

| Material and the dilution (OC-D:water) used | Before wash | After 1 wash | After 2 washes | After 5 washes |
|---|---|---|---|---|
| Linen textile, reference | -- | | | |
| Linen textile 1:4 | +++ | ++ | ++ | - |
| Linen textile 1:1 | +++ | ++ | ++ | ++ |
| Cotton textile, green, reference | -- | | | |
| Cotton textile, green 1:4 | +++ | ++ | ++ | - |
| Cotton textile, green 1:1 | ++ | - | - | - |
| Cotton textile, white, reference | + | | | |
| Cotton textile, white 1:4[1] | ++ | +++ | - | - |
| Cotton textile, white 1:1[1] | - | +++ | +++ | ++ |
| Cotton textile, printed | - | | | |
| Cotton textile, printed 1:4 | ++ | ++ | ++ | - |
| Cotton textile, printed 1:1 | +++ | ++ | ++ | ++ |
| PLA textile, reference | ++ | | | |
| PLA textile 1:4 | +++ | +++ | +++ | +++ |
| PLA textile 1:1 | +++ | ++ | ++ | ++ |
| Polyester textile, reference | - | | | |
| Polyester textile 1:4 | +++ | ++ | ++ | - |
| Polyester textile 1:1 | +++ | +++ | +++ | +++ |
| Hemp textile, reference | -- | | | |
| Hemp textile 1:4 | - | + | - | - |
| Hemp textile 1:1 | - | ++ | ++ | + |
| Viscose NW, reference | -- | | | |
| Viscose NW 1:4[1] | +++ | +++ | +++ | NA |
| Viscose NW 1:1[1] | +++ | +++ | ++ | NA |
| Polyester NW, reference | +++ | | | |
| Polyester NW 1:4[1] | +++ | +++ | +++ | NA |
| Polyester NW 1:1[1] | +++ | +++ | +++ | NA |
| Viscose NW, rug type, purple, reference | ++ | | | |
| Viscose NW, rug type, purple 1:4[1] | +++ | +++ | +++ | NA |
| Viscose NW, rug type, purple 1:1[1] | ++ | - | - | NA |

[1]Only washed two times since it is nonwoven and falls apart more easily than textiles.

Experiment 7—Influence of the Hydrophobicity from different Fats/Oils/Fatty Acids/Resins included in the Fatty PEC Composition A scan of different oils, fatty acids, resins and salts was performed, see FIG. 3.

100% viscose nonwoven was treated with fatty PEC compositions consisting of PEC and RO, CO, S2 and ESBO with the ratio PEC:oil 1:0.5 according to Method 6. The fatty PEC compositions were produced according to Method 1. The hydrophobicity was tested according to Method 5. From previous tests, it was shown that the hydrophobicity develops over time. None of the fatty PEC compositions with RO, CO and S2 was hydrophobic day 0, but PEC:ESBO was and the treated material kept a droplet of water on the surface for around 1 s. Day 1, the material treated with the fatty PEC compositions with PEC and RO, CO, S2 and ESBO gave varying hydrophobicity on the material, see FIG. 3.

Among tested compounds lecithin gave rise to a very hydrophobic NW material. Already after one day it showed ++ to +++ (see FIG. 3) and after four days +++. Additionally, Span 80 gave rise to +++after one week, but all days before that the NW was hydrophilic.

Experiment 8—Study of the Compatibility between PEC Composition with PEC and RO, CO, S2 and ESBO and Various Textile and NW Material Four fatty PEC compositions including fatty compounds RO, CO, ESBO and S2 with the ratio PEC:oil 1:0.5 were produced according to Method 12 and then tested on three different fabrics (the formulations were diluted to 1 wt % prior treatment and used according to Method 2). The treated material were washed according to Method 4. See Table 6 for the hydrophobicity determined according to Method 5.

TABLE 6

Hemp, polyester and PLA textiles were treated with fatty PEC compositions including different oils, all with ratio PEC:oil 1:0.5. Hydrophobicity was detected before wash and after one, three and five washes. Grades of hydrophobicity are according to Method 5.

| Material and treatment | Hydrophobicity | | | |
|---|---|---|---|---|
| | Before wash | After 1 wash | After 3 washes | After 5 washes |
| 100% Hemp | | | | |
| Untreated | -- | | | |
| PEC:RO | + to ++ | + | - | -- |
| PEC:CO | + | + | - | -- |
| PEC:S2 | + to ++ | + | - | -- |
| PES:ESBO | + to ++ | + | - | -- |
| 100% Polyester | | | | |
| Untreated | - | | | |
| PEC:RO | +++ | ++ | ++ | ++ |
| PEC:CO | ++ to +++ | + to ++ | ++ | ++ |
| PEC: S2 | +++ | ++ to +++ | ++ to +++ | +++ |
| PES:ESBO | +++ | +++ | ++ to +++ | +++ |
| 100% PLA | | | | |
| Untreated | +++ | | | |
| PEC:RO | +++ | +++ | +++ | +++ |
| PEC:CO | +++ | +++ | +++ | +++ |
| PEC:S2 | +++ | +++ | +++ | +++ |
| PES:ESBO | +++ | +++ | +++ | +++ |

The study shows that various fatty PEC compositions give rise to hydrophobic textiles and that the hydrophobicity remains after wash.

Experiment 9—Investigation of Hydrophobicity from PEC Composition Comprising of PEC, Water Soluble Plasticizer and Oil In order to increase the softness of the fatty PEC composition treated NW material and maintain hydrophobicity, four new fatty PEC compositions were developed containing additional water soluble plasticizer as follows:

To 50 g of OC-B was added 0.375 g SO according to method 1 (OC-B_SO_0.375)

To 50 g of OC-B was added 0.75 g SO according to method 1 (OC-B_SO_0.75)

To 50 g of OC-B was added 0.375 g S2 according to method 1 (OC-B_S2-0.375)

To 50 g of OC-B was added 0.75 g S2 according to method 1 (OC-B_S2_0.75)

100% viscose nonwoven was treated with the four formulations according to Method 6. For NW treated with OC-B_SO_0.375 and OC-B_SO_0.75, the material was hydrophilic at day 0 but already after two days the droplets stayed on the material for more than ten minutes (+++ according to method 5).

For NW treated with OC-B_S2_0.375, after 2 days, the droplets only stayed for some seconds (+ according to method 6), while NW treated with OC-B_S2_0.75, after 2 days, droplets stayed on the material up to one minute (++ to+++ according to method 5)

Experiment 10—The Influence of Fatty PEC Composition on Mechanical Properties

According to FIG. 3, some fatty PEC compositions resulted in treated NWs with a hydrophobic character. These were chosen to be tested for mechanical properties according to Method 7 and 8 on NW material treated according to Method 6. The result ca be seen in Table 7.

Example 11—Performance Stability of Aged Fatty PEC Compositions

In order to examine the performance stability of fatty PEC compositions, tensile tests were conducted according to Method 8 for NWs treated with aged and freshly prepared fatty PEC compositions OC-D and PEC:S2 1:0.5 (produced according to method 13) See Table 8 for results.

TABLE 8

Wet properties of NW treated with freshly prepared and aged fatty PEC compositions

| Treatment with freshly prepared and aged fatty PEC composition | WET PROPERTIES (100% biobased NW) | | | |
|---|---|---|---|---|
| | Tensile index (Nm/g) | stadv | Tensile stiffness index (Nm/g) | stadv |
| Untreated, Ref | 1.4 | 0.1 | 22.5 | 3.3 |
| OC-D, freshly prepared | 3.7 | 0.3 | 102.7 | 21.2 |
| OC-D 30 days at 50° C. | 2.8 | 0.3 | 76.1 | 30.6 |
| OC-D 45 days at 40° C. | 3.0 | 0.4 | 105.6 | 34.1 |
| PEC:S2 1:0.5, freshly prepared | 3.0 | 0.3 | 67.4 | 16.6 |
| PEC:S2 1:0.5 30 days at 50° C. | 3.0 | 0.2 | 70 | 17.6 |

Table 11 shows that NWs treated with aged formulations compared to freshly prepared give an acceptable variation in mechanical properties. Hydrophobicity remains intact in all cases.

TABLE 7

Dry and wet mechanical properties for nonwoven treated with various fatty PEC compositions.

| Various fatty PEC compositions | DRY PROPERTIES (100% viscose NW) | | | | WET PROPERTIES (100% biobased NW) | | | | | |
|---|---|---|---|---|---|---|---|---|---|---|
| | Strain @ peak (%) | stadv | Tensile stiffness index (Nm/g) | stadv | Strain @ peak (%) | stadv | Tensile index (Nm/g) | stadv | Tensile stiffness index (Nm/g) | stadv |
| Untreated, Ref | 16.4 | 2.5 | 170.3 | 11.9 | 17.7 | 2.7 | 1.4 | 0.1 | 22.5 | 3.3 |
| OC-C | 12.9 | 1.0 | 891.7 | 196.5 | 18.9 | 3.0 | 3.4 | 0.2 | 102.5 | 6.4 |
| OC-D | 11.0 | 1.9 | 1053.3 | 222.8 | 31.6 | 6.2 | 3.7 | 0.3 | 102.7 | 21.2 |
| PEC:RO 1:0.5 | 10.5 | 1.7 | 1148.4 | 230.1 | 18.8 | 2.5 | 2.9 | 0.3 | 98.4 | 16.3 |
| PEC:CO 1:0.5 | 9.5 | 1.6 | 964.9 | 278.0 | 22.1 | 1.4 | 3.1 | 0.2 | 75.8 | 20.9 |
| PEC:ESBO 1:0.5 | 11.7 | 2.4 | 990.6 | 223.8 | 20.3 | 3.3 | 2.8 | 0.2 | 78.4 | 12.2 |
| PEC:S2 1:0.5 | 13.1 | 0.8 | 888.2 | 217.1 | 19.1 | 3.3 | 3.0 | 0.3 | 67.4 | 16.6 |
| PEC:lecithin 1:0.5 | 2.7 | 0.5 | 469.1 | 122.3 | 14.8 | 1.8 | 2.2 | 0.2 | 88.4 | 26.0 |
| OC-E | 4.6 | 1.4 | 1181.8 | 436.3 | 17.3 | 3.9 | 3.8 | 0.2 | 125.1 | 28.2 |
| OC-F | 14.61 | 1.4 | 650.2 | 157.7 | 17.6 | 1.7 | 2.9 | 0.2 | 89.4 | 21.3 |
| OC-G | 12.7 | 2.0 | 752.2 | 281.9 | 20.5 | 1.4 | 3.4 | 0.2 | 85.6 | 12.3 |
| PEC:SEH 77 7P 1:0.5 | 6.6 | 2.1 | 635.5 | 236.0 | 19.1 | 3.1 | 3.0 | 0.5 | 81.7 | 26.5 |
| PEC:SEH 77 30P 1:0.5 | 4.7 | 1.9 | 583.7 | 175.4 | 16.3 | 2.7 | 2.7 | 0.3 | 84.8 | 27.4 |

Based on the results summarized in Table 7 it can be concluded that the various fatty PEC compositions contribute to various mechanical properties, among which one can choose depending on the application.

Experiment 12—Viscosity Study Over Time for Various Fatty PEC Compositions

Viscosity for fatty PEC compositions OC-D and PEC:S2 1:0.5, produced according to Method 12, was followed over time at 23° C., 40° C. and 50° C. From tables 9-12 it is concluded that viscosity change over time and temperature is acceptable.

TABLE 9

Viscosities for PEC composition OC-D at 23° C.

OC-D (23° C.)

| Day | 200 | 150 | 100 | 50 | 10 | 6 | rpm |
|---|---|---|---|---|---|---|---|
| 1 | 1295 | 1367 | 1463 | 1835 | 2219 | 2399 | mPas |
| 37 | 1016 | 1299 | 1469 | n/a | n/a | n/a | mPas |
| 91 | 1187 | 1267 | 1385 | n/a | n/a | n/a | mPas |

TABLE 10

Viscosities for PEC composition OC-D at 40° C.

OC-D (40° C.)

| Day | 200 | 150 | 100 | 50 | 10 | 6 | rpm |
|---|---|---|---|---|---|---|---|
| 45* | 1076 | 1143 | 1247 | 1463 | 2159 | 2599 | mPas |

*Acclimatized at 23° C. for 1 day before measurement.

TABLE 11

Viscosities for PEC composition OC-D at 50° C.

OC-D (50° C.)

| Day | 200 | 150 | 100 | 50 | 10 | 6 | rpm |
|---|---|---|---|---|---|---|---|
| 30* | 989 | 1039 | 1133 | 1403 | 2159 | 2599 | mPas |

*Acclimatized at 23° C. for 1 day before measurement.

TABLE 12

Viscosities for PEC composition PEC:S2 1:0.5 at 23° C. and 50° C.

| | 23° C. | | | 50° C. | | | |
|---|---|---|---|---|---|---|---|
| Day | 200 | 150 | 100 | 200 | 150 | 100 | |
| 1 | 1202 | 1259 | 1337 | | | | mPAs |
| 9 | 950 | 1004 | 1086 | | | | mPAs |
| 29* | | | | 881 | 947 | 1043 | mPAs |

*Acclimatized at 23° C. for 2 days before measurement.

Summary of Experiments 1-12

Using PEC as an emulsifier for oils/fats/fatty acids results in stable emulsions/dispersions. When combining oils and PEC, the result is a fatty PEC composition that can be used as hydrophobic binder/additive for nonwoven, woven, textile and fiber based materials with durable hydrophobicity.

Fatty PEC compositions with sunflower oil is outstanding when it comes to transferring hydrophobicity from the fatty PEC composition to materials. The hydrophobicity appears fast (already one day after treatment) and is durable (lasts for several washes of treated fabric and NW) when applied on several different fabrics and NWs, both of natural and synthetic origin. Tall oil fatty acid (S2) is another composition that transfers its hydrophobicity to fabrics and NWs. It also showed durable hydrophobicity on for example PES fabric. Example of oils comprised in the fatty PEC composition that show hydrophobicity already the same day as treated are ESBO and stand oils of soy bean. Fabrics treated with Span 80 did not show any hydrophobicity the first days after treatment, but one week after treatment it became hydrophobic. Interestingly, Span 80 is partly water soluble.

It has also been shown that various fatty PEC compositions contribute to various mechanical properties, among which one can choose depending on the application. For example, sunflower oil can be the fatty compound comprised in the PEC composition when durable hydrophobicity is desired for a certain material, stand oils can be the fatty compound comprised in the PEC composition when instant hydrophobicity is needed and Span 80 can be the fatty compound comprised in the PEC composition for applications where one week delayed hydrophobicity is required.

Experiments 13-14—Study of the Ability for PEC Compositions to be used as an Additive in Wet End Paper Making To evaluate the ability of the fatty PEC composition to transfer hydrophobic properties to fibers in a fiber suspension, paper sheets were produced where non-fatty PEC composition and fatty PEC composition were added in the wet end of the paper process. The formed paper sheets were evaluated with tensile tests, contact angle and Gurley.

Equipment used in Experiments 13-14

Below, all equipment used in experiments 13-14 is listed.

pH in formulations and paper suspension was measured with pHenomenal pH1000H from VWR with Hamilton Polilyte Lab Temp BNC electrode (calibrated with buffers pH 4, 7 and 10).

Homogenization of formulations in lab scale was done using IKA T25 digital Ultra-Turrax.

Pulp suspension was created using a pulper Tico 732 Hengstler from PTI Austria.

Paper sheets were produced in lab scale using Rapid-Kothen sheet former type RK-2A.

Stirring of formulations and pulp suspensions was done with an overhead stirrer from IKA (either Eurostar digital IKA-Werke or IKA RW28 basic) together with a propeller.

Additional drying of papers from Rapid Kothen was done in an oven from Termaks (suspended with clamps).

Tensile tests were conducted using Testometric M250-2.5AT (machine capacity 2.5 kN) together with Wintest Analysis software.

Contact angle was measured using PGX Serial 50585 from FIBRO Systems AB together with the software The PocketGonimeter Program verison 3.3

Gurley was measured using L&W Densometer (Type: 6_4, No.: 2241) from Lorentzen & Wettre.

Chemicals used in Experiments 13-14

Below, all chemicals used in experiments 13-14 are listed.

| Chemical name | Commercial name | Producer/ Distributor |
|---|---|---|
| 1,2-Benzisothiazol-3(2H)-one, 2-methyl-2H-isothiazol-3-one | Nipacide BSM | Clariant |
| Carboxymethyl cellulose | FinnFix 5 | CP Kelco |
| Chitosan | Chitosan 90/100/A1 | Kraeber |
| Citric acid mono hydrate | Citronsyra Mono E33 8-80M LT | Univar AB |
| Sunflower oil | Sunflower oil 745100 | AAK |

Abbreviations used in Experiments 13-14
Below, all abbreviations used in experiments 13-14 are listed.

| | |
|---|---|
| CMC | Carboxymethyl cellulose |
| OC-C | 2 wt % chitosan 90/100/A1, 2 wt % Finnfix 5, 12 wt % citric acid mono hydrate, 0.2 wt % Nipacide BSM produced according to Method 19 |
| OC-E | 2 wt % chitosan 90/100/A1, 2 wt % Finnfix 5, 12 wt % citric acid mono hydrate, 2 wt % sunflower 745100 (from AAK), 0.2 wt % Nipacide BSM produced according to Method 20 |
| PEC | Polyelectrolyte complex |

Methods used in Experiments 13-14
Below, all methods used in experiments 13-14 are listed.
Method 14: Pulp suspension consisting of sodium hydrogen sulfate bleached CTMP fibres (mean fibre length 1.2-1.5 mm) from Rottneros was prepared in 18-22° C. tap water and diluted to 0.5 wt %. The total amount (40 l) was divided to 2.5 l aliquots and the pH was adjusted to 5.5-6.5 with citric acid solution (citric acid mono hydrate:tap water, 1:2) in every batch, prior use. The strength system (i.e. PEC composition) was then added to the pulp suspension in different amounts and stirred vigorously with a propeller 10 min before the sheet forming was started. The pH was controlled 1-2 times during these 10 min and adjusted to <6.5 if it had risen.
Method 15: Paper sheets were produced using Rapid Köthen sheet former and then dried for 8 min at 92° C. under vacuum (about 100 kPa). The resulting sheets got a paper density of around 60 g/m². Five sheets at each test point were made. In some cases, additional drying at 190° C. for 3 min in Termaks oven was performed.
Method 16: Tensile test for dry papers were performed by using Testometric M250-2.5AT (pretension: 0.1 N, sample length: 100 mm, sample width: 15 mm, speed: 20 mm/min, Loadcell 0: 50 kgf) after aclimatiozation of test specimens at 23° C. and 50% RH for least 1 day. Three test specimen for each paper sheet was cut out and tested.
Method 17: General description of production method for PEC composition without oil/fat as additive (100 g formulation): 1. Homogenize 71.8 g water and 2 g CMC Finnfix 5 with Ultraturrax T25 with speed 9000 rpm for 3 min. 2. Disperse 2 g chitosan in the CMC-solution. 3. Dissolve 12 g citric acid mono hydrate in 12 g water and add to the biopolymer solution. Homogenize using 12000 rpm for 3 min. 4. Add 0.2 g Nipacide BSM. Homogenize 1 min.
Method 18: General description of production method for PEC composition including oil/fat as additive (100 g formulation): 1. Homogenize 69.8 g water and 2 g CMC Finnfix 5 with Ultraturrax T25 with speed 9000 rpm for 5 min. 2. Disperse 2 g chitosan in the biopolymer solution. 3. Dissolve 12 g citric acid mono hydrate in 12 g water and add to the CMC-solution. Homogenize using 12000 rpm for 5 min. 4. Add 2 g oil/fat to the mixture. Homogenize with speed 12000 rpm for 5 min. 5. Add 0.2 g Nipacide BMS. Homogenize 1 min.

Experiment 13—Mechanical Performance and Contact Angle Measurements of Fatty PEC Composition Treated Paper Pulp suspension was made according to Method 14 and papers with and without PEC compositions (fatty and non fatty) were produced according to Method 16. Since the amount of PEC in relation to fibers is important, it was decided to add the two compositions (OC-C and OC-E) to the paper suspension so that the amount PEC to fibers became 1 and 0.5% (d/d). The formulations were diluted to 1 wt % based on PEC, to facilitate mixing of PEC into fiber suspension, prior to addition to the pulp suspension. Dry tensile tests were conducted using Method 16. The results are shown in Table 13.

TABLE 13

Mechanical properties of papers produced with and without additions of OC-C and OC-E to the pulp suspension. Addition to fiber is calculated on the PEC solid content in the formulations.

| Formulation | Addition to fiber (dry/dry) [%] | Mean tensile index [Nm/g] | Stdav tensile index [Nm/g] | Increase in tensile index [%] | Mean final strain [%] | Stdav final strain [%] | Increase in final strain [%] | Mean tensile stiffness index [Nm/g] | Stdav tensile stiffness index [Nm/g] | Increase in tensile stiffness index [%] |
|---|---|---|---|---|---|---|---|---|---|---|
| Ref | 0 | 18.84 | 2.11 | | 1.03 | 0.16 | | 2800.54 | 221.34 | |
| OC-C | 0.5 | 22.49 | 1.38 | 19.37 | 1.37 | 0.15 | 32.56 | 2666.31 | 172.43 | −4.79 |
| | 1 | 25.05 | 1.73 | 32.96 | 1.29 | 0.12 | 25.30 | 2885.23 | 194.37 | 3.02 |
| OC-E | 0.5 | 20.90 | 2.01 | 10.93 | 1.51 | 0.21 | 46.65 | 2489.97 | 228.75 | −11.09 |
| | 1 | 25.86 | 1.57 | 37.28 | 1.32 | 0.08 | 28.13 | 3175.22 | 157.44 | 13.38 |

From Table 13 it is seen that addition of the fatty PEC composition OC-E results in higher increase in final strain than using only PEC OC-C as an additive when adding small amount of additive (0.5% d/d) in relation to fiber. Also, increase in tensile stiffness is larger for the largest amounts of additive in relation (1% d/d) to fiber for fatty PEC composition OC-E compared to only OC-C.

A second trial where the compositions were added to the pulp suspension so that the amount of total solid content to fibers became 0.5 and 1% (d/d), instead of the PEC solid content to fibers as shown above. The formulations were diluted to 1 wt % based on total solid content, to facilitate mixing of PEC into fiber suspension, prior addition. Dry tensile tests were conducted using Method 15. The results are shown in Table 14.

TABLE 14

Mechanical properties of papers produced with and without additions of OC-C and OC-E to the pulp suspension. Addition to fiber is calculated on the total solid content in the formulations.

| Formulation | Addition to fiber (dry/dry) [%] | Mean tensile index [Nm/g] | Stdav tensile index [Nm/g] | Increase in tensile index [%] | Mean final strain [%] | Stdav final strain [%] | Increase in final strain [%] | Mean tensile stiffness index [Nm/g] | Stdav tensile stiffness index [Nm/g] | Increase in tensile stiffness index [%] |
|---|---|---|---|---|---|---|---|---|---|---|
| ref | 0 | 18.84 | 2.11 | | 1.03 | 0.16 | | 2800.54 | 221.34 | |
| OC-C | 0.5 | 20.96 | 0.78 | 11.22 | 1.10 | 0.08 | 6.69 | 2917.81 | 145.81 | 4.19 |
| | 1 | 19.65 | 1.74 | 4.31 | 1.09 | 0.12 | 5.50 | 2726.42 | 153.53 | −2.65 |
| OC-E | 0.5 | 20.10 | 0.72 | 6.71 | 1.13 | 0.08 | 10.00 | 2771.57 | 113.82 | −1.03 |
| | 1 | 20.84 | 2.02 | 10.61 | 1.15 | 0.10 | 11.88 | 2843.39 | 246.03 | 1.53 |

From table 19 it is obvious that the increase in final strain is doubled for the fatty PEC composition OC-E compared to only OC-C. Based on the results from table 18 and 19, it is concluded that a small addition of fatty PEC composition OC-E is better than large addition when higher strain is needed for the material.

Table 15 shows the dynamic contact angle over a period of 60 s for paper containing OC-C and fatty PEC composition OC-E as additive when 0.5% and 1% (d/d) additions to fiber was calculated on the PEC solid content.

TABLE 15

Contact angles of paper produced with and without additions of OC-C and OC-E to the pulp suspension. Addition to fiber is calculated on the PEC solid content in the formulations. All three tests are done on the same sheet.

| | | Dynamic contact angle [°] | | | | | | | | |
|---|---|---|---|---|---|---|---|---|---|---|
| | Addition to fiber (dry/dry) | Test 1 | | | Test 2 | | | Test 3 | | |
| Formulation | [%] | 1 s | 30 s | 60 s | 1 s | 30 s | 60 s | 1 s | 30 s | 60 s |
| Ref | 0 | <45 | 0 | 0 | <45 | 0 | 0 | <45 | 0 | 0 |
| OC-C | 0.5 | 101.7 | <45 | 0 | 91.4 | <45 | 0 | 99.1 | 0 | 0 |
| | 1 | 81.2 | 0 | 0 | 73.6 | 0 | 0 | 75.4 | 0 | 0 |
| OC-E | 0.5 | 102.6 | 102.0 | 100.8 | 107.7 | 107.7 | 103.7 | 104.0 | 100.1 | 101.0 |
| | 1 | 97.3 | 91.2 | 91.7 | 107.1 | 103.8 | 103.2 | 99.2 | 97.5 | 96.7 |

Results in Table 15 show that using OC-C as additive to pulp suspension give relatively high initial contact angles but that the water is absorbed by the paper within 60 s. Using the fatty PEC composition OC-E as an additive to pulp suspension results in a hydrophobic paper that has an initial contact angle around 100° which is unaffected over at least 60 s.

Experiment 14—Change in Air Permeability Imparted by the Fatty PEC Composition when Used as an Additive to Pulp Suspension Pulp suspension was made according to Method 13 and papers with fatty PEC compositions were produced according to Method 15. To determine the air permeability of the papers Gurley method was used and Gurley seconds for 100 cc was determined. Two paper sheets for each test point were measured at three different spots. The results are shown in table 16.

TABLE 16

Gurley (100 CC) for papers produced with and without additions of OC-C and OC-E to the pulp suspension. Addition to fiber is calculated on the PEC solid content in the formulations.

| | | | Gurley for 100 CC [gurley seconds] | | | | | | | |
|---|---|---|---|---|---|---|---|---|---|---|
| Formulation | Series | Addition to fiber (dry/dry) [%] | Sheet 1 | | | Sheet 2 | | | Mean Gurley seconds | stdav |
| Ref | 1a. | 0 | 2.8 | 2.9 | 3.1 | 4.2 | 4.2 | 4.3 | 3.6 | 0.7 |
| OC-C | 10. | 0.5 | 3.9 | 4.0 | 3.9 | 3.0 | 3.0 | 2.9 | 3.5 | 0.5 |
| | 7. | 1 | 3.1 | 3.0 | 3.0 | 2.7 | 2.7 | 2.7 | 2.9 | 0.2 |
| OC-E | 11. | 0.5 | 3.7 | 3.7 | 3.7 | 3.0 | 3.0 | 2.9 | 3.3 | 0.4 |
| | 8. | 1 | 2.6 | 2.0 | 2.1 | 3.5 | 3.5 | 3.5 | 2.9 | 0.7 |

From table 16 it can be concluded that there is no significant difference between untreated reference paper and paper where OC-C and fatty PEC composition OC-E are used as additive. Hence, the fatty PEC composition does not or slightly affects the air permeability.

Summary of Experiment 13-14

Experiments 14-15 show that the fatty PEC composition of the invention is a highly suitable wet end additive in paper making process, where both mechanical and surface properties can be affected.

Materials treated with the PEC composition of the present invention need curing to develop the mechanical and hydrophobic properties meant through treatment. The curing can be done at temperatures between 20° C. and 200° C., preferably between 80° C. and 190° C., more preferably between 120° C. and 180° C. For reaching the best results, the curing temperature and time need to be optimized for each material and process.

As will be understood by those skilled in the present field of art, numerous changes and modifications may be made to the above described and other embodiments of the present invention, without departing from its scope as defined in the appending claims. For example, the pulps may be any kind of pulp, i.e. mechanical pulp, thermo-mechanical pulp, chemo-mechanical pulp, sulphate pulp, sulphite pulp, bleached pulp, unbleached pulp, short-fiber pulp, long-fiber pulp, recycled fibers, mixtures of different pulp grades etc. The invention works irrespective of the kind of pulp chosen.

The term paperboard is here used as wide term including all kinds of different cellulose-based board grades, e.g. paper board, cardboard, corrugated board, single or multiply board, folding boxboard, chipboard etc.

While for the clarity reasons, the PEC compositions are described in the following claims only as binders for fiber based materials, textiles, woven and nonwoven materials (i.e. applied in the dry end of the paper making process), it is equally understood that they can act as strength additives in the wet end of the paper making process.

Without exceeding the scope of the present invention, various acids employed in the synthesis of the PEC compositions (i.e. carboxylic acids, fatty acids, lignosulfonic acid, etc), may equally be used in their salt form.

Various aspects and embodiments of the present invention are defined by the following numbered claims.

The invention claimed is:

1. A method of treating materials selected from fiber based materials, textiles, woven and nonwoven materials the method comprising:
    a) applying to said materials an emulsion or dispersion binder composition comprising a biobased polyelectrolyte complex (PEC) composition suitable as a binder, wherein said PEC composition comprises a cationic biopolymer, an anionic biopolymer, an acid, a preservative and one or more fatty compounds, wherein,
        the net charge of the PEC composition is cationic,
        the charge ratio of the anionic biopolymer and the cationic biopolymer is ≤1,
        the cationic biopolymer is chitosan, wherein chitosan has a degree of deacetylation being 66-100%,
        the anionic biopolymer is a polyanion derived from nature,
        the acid is a Brønsted acid and/or a Lewis acid, wherein the Brønsted acid is selected from any organic and/or inorganic acids, wherein the Lewis acid is selected from any cationic mono- or multivalent atom,
        the weight ratio between cationic biopolymer and anionic biopolymer is 1:0.1 to 1:20,
        the weight ratio between the cationic biopolymer and acid is 1:0.01 to 1:30,
        the pH is less than 7,
        the one or more fatty compounds comprises one or more of sunflower oil, soy bean oil, tall oil, corn oil, rapeseed oil, coconut oil and palm oil and wherein the weight ratio of PEC:fatty compound in said PEC composition is from 1:0.5 to 1:1; and
    b) obtaining both an increase in a hydrophobicity of the materials and an increase in at least one mechanical property of the materials selected from dry strength, wet strength, tensile stiffness and tensile softness.

2. The method of treating materials according to claim 1, wherein said fiber based material consists of paper and/or paperboard and said treatment is performed either during manufacture of said paper and/or paperboard or on already finished paper and/or paperboard.

3. The method of treating materials according to claim 1, comprising the steps of;
    a. treating the fiber based materials, textiles, woven and nonwoven materials with the PEC composition by one or more of:
        i. adding to suspensions of fiber based materials, textiles, woven and nonwoven materials,
        ii. spray coating,
        iii. dip coating,
        iv. roll coating,
        v. impregnation,
        vi. padding,
        vii. screen coating,
        viii. printing,
        ix. direct coating methods including knife coating, blade coating, wire wound bar coating, round bar coating and crushed foam coating,
        x. indirect coating methods including mayer rod coating, direct roll coating, kiss coating, gravure coating and reverse roll coating, and
        xi. ink jet and/or slit-die/slot-die; and
    b. optionally curing the treated fiber based materials, textiles woven and nonwoven materials, preferably the curing is performed at 20° C. to 200° C.

4. The method according to claim 3, comprising curing the treated fiber based materials, textiles, woven and nonwoven materials, preferably the curing is performed at 120° C. to 180° C.

5. The method according to claim 1, comprising diluting the PEC composition with water selected from distilled water, tap water, and deionized water prior to the step of applying to said materials the emulsion or dispersion binder composition comprising the PEC composition.

* * * * *